United States Patent
Hu et al.

(10) Patent No.: US 12,224,667 B2
(45) Date of Patent: Feb. 11, 2025

(54) VOLTAGE REGULATION APPARATUS AND OVERCURRENT PROTECTION METHOD

(71) Applicant: HUAWEI TECHNOLOGIES CO., LTD., Guangdong (CN)

(72) Inventors: Zhangrong Hu, Shanghai (CN); Xuegang Yang, Shenzhen (CN); Kun Wu, Shanghai (CN); Yi Wang, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 222 days.

(21) Appl. No.: 18/148,123

(22) Filed: Dec. 29, 2022

(65) Prior Publication Data
US 2023/0145254 A1 May 11, 2023

Related U.S. Application Data

(63) Continuation of application No. PCT/CN2020/099189, filed on Jun. 30, 2020.

(51) Int. Cl.
*H02M 3/158* (2006.01)
*H02H 5/04* (2006.01)
*H02M 1/00* (2006.01)

(52) U.S. Cl.
CPC .......... *H02M 3/1582* (2013.01); *H02H 5/041* (2013.01); *H02M 1/0009* (2021.05)

(58) Field of Classification Search
CPC ... H02M 3/1582; H02M 1/0009; H02H 5/041
See application file for complete search history.

(56) References Cited

U.S. PATENT DOCUMENTS 9,689,925 B2  6/2017  Berland et al.
9,825,518 B2 * 11/2017  Shen ................. H02M 3/33507
(Continued)

FOREIGN PATENT DOCUMENTS

CN  101854765 A  10/2010
CN  102064807 A  5/2011
(Continued)

OTHER PUBLICATIONS

Qualcomm Technologies, Inc., PM8916/PM8916-1 Power Management ICs, https://docplayer.net/79423439-Pm8916-pm-power-management-ics.html, Mar. 13, 2018, 91 pages.
(Continued)

*Primary Examiner* — Rafael O De Leon Domenech

(57) ABSTRACT

A voltage regulation apparatus and an overcurrent protection method are disclosed. The voltage regulation apparatus includes a current detection control circuit, a power stage circuit, a voltage input terminal, and a voltage output terminal. The power stage circuit includes at least one transistor. Because a current parameter indicates a load current of the at least one transistor, and a plurality of preset overcurrent protection thresholds are dynamic overcurrent protection thresholds obtained after being preset based on temperature information and the like, after obtaining the current parameter, the current detection control circuit compares the current parameter with the plurality of preset overcurrent protection thresholds, to output a control signal, to implement a limiting operation on the current parameter.

20 Claims, 14 Drawing Sheets

(56) References Cited

U.S. PATENT DOCUMENTS

| | | | | |
|---|---|---|---|---|
| 11,309,707 | B2* | 4/2022 | Atluri | H02H 9/02 |
| 2008/0116872 | A1* | 5/2008 | Nakazono | H02M 3/156 |
| | | | | 323/284 |
| 2009/0014433 | A1* | 1/2009 | O'Neil | G06F 1/206 |
| | | | | 219/491 |
| 2011/0110009 | A1 | 5/2011 | Sugimoto et al. | |
| 2011/0211282 | A1* | 9/2011 | Nanov | H02M 1/32 |
| | | | | 361/18 |
| 2014/0146581 | A1 | 5/2014 | Tsou et al. | |
| 2015/0123629 | A1 | 5/2015 | Ohshima | |
| 2015/0295488 | A1 | 10/2015 | Shen et al. | |

FOREIGN PATENT DOCUMENTS

| | | |
|---|---|---|
| CN | 102104244 A | 6/2011 |
| CN | 101809853 B | 11/2013 |
| CN | 103795034 A | 5/2014 |
| CN | 109347056 A | 2/2019 |
| CN | 109842297 A | 6/2019 |
| FR | 2870996 A1 | 12/2005 |

OTHER PUBLICATIONS

Qualcomm Technologies, Inc., PMM8920 Power Management Module Device Specification, https://developer.qualcomm.com/download/sd600/pmm8920-power-management-module-device-specification.pdf, Jun. 2015, 144 pages.

Qualcomm Technologies, Inc., PM8994/PM8996 Power Management IC, https://manuals.plus/m/66ad364b47d4984b32998a0e9016c5ece532360fb121c59a70b1e2a51b0e07db, Feb. 15, 2018, 91 pages.

Qualcomm Technologies, Inc., PMI8994/PMI8996 Power Management IC, https://vaska.pro/datasheet/PMI8994-PMI8996.pdf, Feb. 16, 2018, 103 pages.

Qualcomm Technologies, Inc., PM8953 Power Management IC, https://picture.iczhiku.com/resource/eetop/whIRgOTHZeuDSBmB.pdf, May 30, 2016, 82 pages.

* cited by examiner

VOLTAGE REGULATION APPARATUS AND OVERCURRENT PROTECTION METHOD

CROSS-REFERENCE TO RELATED APPLICATIONS

This application is a continuation of International Application No. PCT/CN2020/099189, filed Jun. 30, 2020, the disclosure of which is hereby incorporated by reference in its entirety.

TECHNICAL FIELD

Embodiments of this application relate to the field of circuit technologies, and in particular, to a voltage regulation apparatus and an overcurrent protection method.

BACKGROUND

In recent years, consumer electronic products such as smartphones and tablet computers are developing rapidly. However, a power system for consumer electronic products such as smartphones or tablet computers usually uses a buck converter circuit (BUCK) architecture to supply power to a load. Considering reliability of the power system, when a load current is excessively high, current limiting protection is easily triggered, to disable an output of a chip. Overcurrent protection of the BUCK architecture is not only to avoid damage to the chip caused by overheating inside the chip, but also to protect an inductor outside the chip so that a temperature rise current of the inductor falls within a preset rule to avoid burnout.

However, in an existing overcurrent protection solution, a fixed load current is statically set as a protection threshold, and overcurrent protection is implemented once triggered, that is, a transistor is turned off. Moreover, the existing overcurrent protection solution is actually applicable to a scenario with a constant high-current load. For a scenario with a non-constant current load, for example, a system on chip (SOC) including a graphics processing unit (GPU), the existing overcurrent protection solution is not effective in this scenario. For example, to ensure overcurrent protection effect, the existing overcurrent protection solution causes a design specification of a chip, a peripheral component, or the like to far exceed an actual requirement, which not only affects a miniaturization trend of a terminal product, but also leads to an obvious over-design.

SUMMARY

Embodiments of this application provide a voltage regulation apparatus and an overcurrent protection method, applicable to a scenario with a non-constant current load, to achieve good overcurrent protection effect. To resolve the foregoing problem, embodiments of this application provide the following technical solutions:

According to a first aspect, an embodiment of this application provides a voltage regulation apparatus. The voltage regulation apparatus includes a current detection control circuit, a power stage circuit, a voltage input terminal, and a voltage output terminal. The power stage circuit includes at least one transistor. The current detection control circuit is configured to: obtain a current parameter of the power stage circuit, where the current parameter indicates a load current of the at least one transistor; and compare the current parameter with a plurality of preset overcurrent protection thresholds, to output a control signal. The control signal is used to limit the current parameter. In the foregoing solution, because the power stage circuit may include at least one transistor, the voltage regulation apparatus provided in this embodiment may include an LDO circuit, a BUCK circuit, a BOOST circuit, a BUCK-BOOST circuit, or the like. Because the current parameter can indicate the load current of the at least one transistor, for example, in the LDO circuit, the current parameter may be a valid value or the like of a load current of a transistor. Alternatively, in a switch power supply such as the BUCK circuit, the BOOST circuit, or the BUCK-BOOST circuit, because at least one transistor may include at least one upper transistor and at least one lower transistor, the current parameter may alternatively be an average value, that is, an average load current, of a load current of the at least one upper transistor and a load current of the at least one lower transistor, or the current parameter may be a valid value related to a load current of the at least one upper transistor and a load current of the at least one lower transistor, or the like. In addition, the plurality of preset overcurrent protection thresholds are dynamic overcurrent protection thresholds obtained after being preconfigured based on temperature information or the like. Therefore, after the current parameter is obtained, the current parameter may be compared with the plurality of preset overcurrent protection thresholds, to output the control signal based on a comparison result. Therefore, a limiting operation is performed on the current parameter based on the control signal. In this way, the current parameter can be limited based on the dynamic thresholds, and the current parameter can be limited to a criterion in which a current does not cause thermal damage to a component such as a chip, a transistor, or an inductor. Compared with an existing current limiting mechanism in which current limiting is directly enabled when I≥Ia, this mechanism provided in this application is applicable to a scenario with a non-constant current load, meets a miniaturization trend of a terminal product, and avoids an over-design, to achieve good overcurrent protection effect.

In a possible implementation, the current detection control circuit includes a current limiting control module. The current limiting control module is configured to: compare the current parameter with the plurality of preset overcurrent protection thresholds to obtain a comparison result, where the comparison result indicates a level of the load current in the plurality of preset overcurrent protection thresholds; and select, based on the comparison result, a target over-limit duration threshold from a plurality of over-limit duration thresholds corresponding to the plurality of preset overcurrent protection thresholds, and output the control signal when a first duration is greater than the target over-limit duration threshold. The first duration is a duration in which the current parameter is greater than or equal to a current limiting threshold. The plurality of preset overcurrent protection thresholds are all greater than the current limiting threshold. In the foregoing solution, the foregoing current limiting threshold is equivalent to a fixed protection threshold in an existing solution. However, in this embodiment of this application, an OCP parameter is preconfigured in register configuration, that is, the current limiting threshold, the plurality of preset overcurrent protection thresholds, the over-limit duration thresholds and controlled duration thresholds corresponding to the plurality of preset overcurrent protection thresholds, or the like. The plurality of preset overcurrent protection thresholds are all greater than the current limiting threshold. Based on a heat balance principle, when reliability of a chip, a peripheral component or the like is ensured, when the current parameter is greater than or equal to the current limiting threshold, the load current continues to work for a period of time, rather than directly enabling current limiting as that in the existing current limiting mechanism. Therefore, to implement overcurrent protection based on the dynamic threshold, in this embodiment of this application, after the current parameter is obtained, the current parameter is compared with the plurality of preset overcurrent protection thresholds in the register configuration. The comparison result can indicate two preset overcurrent protection thresholds between which the load current is located in the plurality of preset overcurrent protection thresholds. In addition, the target over-limit duration threshold is selected based on the comparison result. On a basis that the duration in which the current parameter is greater than or equal to the current limiting threshold is recorded as a first duration, the first duration is compared with the target over-limit duration threshold. When the first duration is greater than or equal to the target over-limit duration threshold, the foregoing control signal is output.

In another possible implementation, the current detection control circuit further includes a temperature obtaining module. The temperature obtaining module is configured to obtain temperature information. The current limiting control module is further configured to set each of the plurality of over-limit duration thresholds to a second duration based on the temperature information. In the foregoing solution, because the temperature may include an ambient temperature and temperatures of components such as a chip, a transistor, and an inductor, and the temperature can affect an over-limit duration. Generally, the over-limit duration decreases as the temperature increases, and increases as the temperature decreases. Therefore, in this embodiment of this application, the over-limit duration threshold may be further dynamically adjusted based on the temperature, that is, the temperature information is obtained based on the temperature obtaining module, so that the current limiting control module sets each of the plurality of over-limit duration thresholds to the second duration based on the temperature information. In addition, the plurality of over-limit duration thresholds decrease as the temperature indicated by the temperature information increases, and increase as the temperature indicated by the temperature information decreases. In other words, each of the plurality of over-limit duration thresholds in the register configuration is set based on the temperature information, so that the over-limit duration threshold obtained after the setting can be used to compare with the foregoing first duration, and the current limiting control module can more flexibly predetermine whether the current limiting is enabled. In addition, the foregoing temperature information includes at least one of the following: ambient temperature information, and temperature information of the components such as the chip, the transistor, and the inductor.

In another possible implementation, the current detection control circuit further includes a timing module. The current limiting control module is further configured to compare the current parameter with the current limiting threshold before comparing the current parameter with the plurality of preset overcurrent protection thresholds. The timing module is configured to count the first duration when the current parameter is greater than or equal to the current limiting threshold. In the foregoing solution, the first duration can indicate the duration in which the current parameter is greater than or equal to the current limiting threshold. In addition, based on the heat balance principle, it can ensure that the reliability of the component such as the chip, the inductor, or the transistor within the duration is not affected, so that the first duration can be used as a basis for comparison with the target over-limit duration threshold.

In another possible implementation, the current limiting control module is further configured to select, based on the comparison result, a target controlled duration threshold from a plurality of controlled duration thresholds corresponding to the plurality of preset overcurrent protection thresholds, and control, based on the target controlled duration threshold, limiting time in which the control signal limits the current parameter. In the foregoing solution, when the current limiting control module outputs the control signal to limit the current parameter, the control signal can further trigger a countdown, and control, based on the target controlled duration threshold, the limiting time in which the control signal limits the current parameter. After the countdown of the target controlled duration threshold is completed, the control signal is cleared, and the current parameter is no longer limited.

In another possible implementation, the control signal being used to limit the current parameter includes: The control signal is used to turn off the at least one transistor, to limit the current parameter. Alternatively, the control signal is used to limit a current passing through the at least one transistor to a corresponding standard current, to limit the current parameter. In the foregoing solution, the at least one transistor may be turned off by using the control signal. In addition, the current passing through the at least one transistor may be limited to the corresponding standard current. A plurality of possible implementations are provided to limit a current limiting parameter, to further implement overcurrent protection.

In another possible implementation, the voltage regulation apparatus further includes a switch control circuit. The switch control circuit is configured to receive a feedback voltage indicating the output voltage, and control the at least one transistor based on the feedback voltage, to regulate the output voltage. In the foregoing solution, precise control of the output voltage may be implemented by using the switch control circuit. In addition, there is an "AND gate" relationship between the switch control circuit and the current detection control circuit. After an "AND" operation is performed on the switch control circuit and the current detection control circuit, the at least one transistor is controlled. However, once the current detection control circuit enables the foregoing current limiting, when the control signal is output to limit the current parameter to implement overcurrent protection, turn-on of the at least one transistor cannot be controlled by the switch control circuit based on the feedback voltage.

In another possible implementation, the voltage regulation apparatus further includes a filtering network. The filtering network is coupled to the voltage output terminal or the voltage input terminal. In the foregoing solution, the filtering network may include an inductor and a capacitor.

In another possible implementation, the at least one transistor includes a first upper transistor and a first lower transistor. An out terminal of the switch control circuit and an out terminal of the current detection control circuit are connected to a gate of the first upper transistor by using an AND gate, a source of the first upper transistor is connected to the voltage input terminal, and a drain of the first upper transistor is coupled to the filtering network. Alternatively, an out terminal of the switch control circuit and an out terminal of the current detection control circuit are connected to a gate of the first upper transistor by using an AND gate, a source of the first upper transistor is coupled to the filtering network, and a drain of the first upper transistor is connected to the voltage input terminal. The out terminal of the switch control circuit and the out terminal of the current detection control circuit are connected to a gate of the first lower transistor by using an AND gate, a source of the first lower transistor is connected to a ground terminal, and a drain of the first lower transistor is coupled to the filtering network. In the foregoing solution, in the foregoing connection manner of the first upper transistor and the first lower transistor, the voltage regulation apparatus can be applied to a BUCK circuit, so that overcurrent protection can also be implemented in the BUCK circuit based on the dynamic overcurrent protection threshold or the like.

In another possible implementation, the at least one transistor includes a first upper transistor and a first lower transistor. An out terminal of the switch control circuit and an out terminal of the current detection control circuit are connected to a gate of the first upper transistor by using an AND gate, a source of the first upper transistor is connected to the voltage output terminal, and a drain of the first upper transistor is coupled to the filtering network. The out terminal of the switch control circuit and the out terminal of the current detection control circuit are connected to a gate of the first lower transistor by using an AND gate, a source of the first lower transistor is connected to a ground terminal, and a drain of the first lower transistor is coupled to the filtering network. In the foregoing solution, in the foregoing connection manner of the first upper transistor and the first lower transistor, the voltage regulation apparatus can be applied to a BOOST circuit, so that overcurrent protection can also be implemented in the BOOST circuit based on the dynamic overcurrent protection threshold or the like.

According to a second aspect, an embodiment of this application provides another voltage regulation apparatus. The voltage regulation apparatus includes a current detection control circuit, a power stage circuit, a temperature obtaining module, a voltage input terminal, and a voltage output terminal. The power stage circuit includes at least one transistor. The voltage input terminal is configured to receive an input voltage. The voltage output terminal is configured to generate an output voltage. The temperature obtaining module is configured to obtain temperature information. The current detection control circuit is configured to: set a current limiting threshold to a first value based on the temperature information, and obtain a current parameter of the power stage circuit, where the current parameter indicates a load current of the at least one transistor; and compare the current parameter with the current limiting threshold, to output a control signal. The control signal is used to limit the current parameter. In the foregoing solution, the temperature information may include but is not limited to heat information caused by an ambient temperature or temperatures of components such as a chip, a transistor, and an inductor, and a temperature rise causes an increase in a temperature rise current. Therefore, the temperature obtaining module may be added to the voltage regulation apparatus, and the temperature obtaining module can obtain the temperature information, so that the current limiting control module sets the current limiting threshold to the first value based on the temperature information. A through-current capability of the component such as the inductor can be explored to a maximum extent, and the current limiting threshold obtained after the setting can be flexibly used as a dynamic overcurrent protection threshold, so that the current detection control circuit can compare the current parameter with the current limiting threshold, and output the control signal when the current parameter is greater than or equal to the current limiting threshold. The control signal is used to limit the current parameter.

In another possible implementation, the control signal being used to limit the current parameter includes: The control signal is used to turn off the at least one transistor, to limit the current parameter. Alternatively, the control signal is used to limit a current passing through the at least one transistor to a corresponding standard current, to limit the current parameter. In the foregoing solution, the at least one transistor may be turned off by using the control signal. In addition, the current passing through the at least one transistor may be limited to the corresponding standard current. A plurality of possible implementations are provided to limit a current limiting parameter, to further implement overcurrent protection.

In another possible implementation, the voltage regulation apparatus further includes a switch control circuit. The switch control circuit is configured to receive a feedback voltage indicating the output voltage, and control the at least one transistor based on the feedback voltage, to regulate the output voltage. In the foregoing solution, precise control of the output voltage may be implemented by using the switch control circuit. In addition, there is an "AND gate" relationship between the switch control circuit and the current detection control circuit. After an "AND" operation is performed on the switch control circuit and the current detection control circuit, the at least one transistor is controlled. However, once the current detection control circuit enables the foregoing current limiting, when the control signal is output to limit the current parameter to implement overcurrent protection, turn-on of the at least one transistor cannot be controlled by the switch control circuit based on the feedback voltage.

In another possible implementation, the voltage regulation apparatus further includes a filtering network. The filtering network is coupled to the voltage output terminal or the voltage input terminal. In the foregoing solution, the filtering network may include an inductor and a capacitor.

In another possible implementation, the at least one transistor includes a first upper transistor and a first lower transistor. An out terminal of the switch control circuit and an out terminal of the current detection control circuit are connected to a gate of the first upper transistor by using an AND gate, a source of the first upper transistor is connected to the voltage input terminal, and a drain of the first upper transistor is coupled to the filtering network. Alternatively, an out terminal of the switch control circuit and an out terminal of the current detection control circuit are connected to a gate of the first upper transistor by using an AND gate, a source of the first upper transistor is coupled to the filtering network, and a drain of the first upper transistor is connected to the voltage input terminal. The out terminal of the switch control circuit and the out terminal of the current detection control circuit are connected to a gate of the first lower transistor by using an AND gate, a source of the first lower transistor is connected to a ground terminal, and a drain of the first lower transistor is coupled to the filtering network. In the foregoing solution, in the foregoing connection manner of the first upper transistor and the first lower transistor, the voltage regulation apparatus can be applied to a BUCK circuit, so that overcurrent protection can also be implemented in the BUCK circuit based on the dynamic overcurrent protection threshold or the like.

In another possible implementation, the at least one transistor includes a first upper transistor and a first lower transistor. An out terminal of the switch control circuit and an out terminal of the current detection control circuit are connected to a gate of the first upper transistor by using an AND gate, a source of the first upper transistor is connected to the voltage output terminal, and a drain of the first upper transistor is coupled to the filtering network. The out terminal of the switch control circuit and the out terminal of the current detection control circuit are connected to a gate of the first lower transistor by using an AND gate, a source of the first lower transistor is connected to a ground terminal, and a drain of the first lower transistor is coupled to the filtering network. In the foregoing solution, in the foregoing connection manner of the first upper transistor and the first lower transistor, the voltage regulation apparatus can be applied to a BOOST circuit, so that overcurrent protection can also be implemented in the BOOST circuit based on the dynamic overcurrent protection threshold or the like.

According to a third aspect, an embodiment of this application provides an overcurrent protection method. The method may be applied to a voltage regulation apparatus. The method may include: obtaining a current parameter of a power stage circuit, where the current parameter indicates a load current of at least one transistor in the power stage circuit; and comparing the current parameter with a plurality of preset overcurrent protection thresholds, to output a control signal. The control signal is used to limit the current parameter.

In a possible implementation, the comparing the current parameter with a plurality of preset overcurrent protection thresholds, to output a control signal includes: comparing the current parameter with the plurality of preset overcurrent protection thresholds to obtain a comparison result, where the comparison result indicates a level of the load current in the plurality of preset overcurrent protection thresholds; and selecting, based on the comparison result, a target over-limit duration threshold from a plurality of over-limit duration thresholds corresponding to the plurality of preset overcurrent protection thresholds, and outputting the control signal when a first duration is greater than the target over-limit duration threshold. The first duration is a duration in which the current parameter is greater than or equal to a current limiting threshold. The plurality of preset overcurrent protection thresholds are all greater than the current limiting threshold.

In another possible implementation, the method further includes: obtaining temperature information, and setting each of the plurality of over-limit duration thresholds to a second duration based on the temperature information.

In another possible implementation, the method further includes: comparing the current parameter with the current limiting threshold before comparing the current parameter with the plurality of preset overcurrent protection thresholds, and counting the first duration when the current parameter is greater than or equal to the current limiting threshold.

In another possible implementation, the method further includes: selecting, based on the comparison result, a target controlled duration threshold from a plurality of controlled duration thresholds corresponding to the plurality of preset overcurrent protection thresholds, and controlling, based on the target controlled duration threshold, limiting time in which the control signal limits the current parameter.

In another possible implementation, the control signal being used to limit the current parameter includes: The control signal is used to turn off the at least one transistor, to limit the current parameter. Alternatively, the control signal is used to limit a current passing through the at least one transistor to a corresponding standard current, to limit the current parameter.

In another possible implementation, the method further includes: receiving a feedback voltage indicating an output voltage, and controlling the at least one transistor based on the feedback voltage, to regulate the output voltage.

According to a fourth aspect, an embodiment of this application provides an overcurrent protection method. The method is applied to a voltage regulation apparatus. The method includes: obtaining temperature information; setting a current limiting threshold to a first value based on the temperature information, and obtaining a current parameter of a power stage circuit, where the current parameter indicates a load current of at least one transistor in the power stage circuit; and comparing the current parameter with the current limiting threshold, to output a control signal. The control signal is used to limit the current parameter.

In another possible implementation, the control signal being used to limit the current parameter includes: The control signal is used to turn off the at least one transistor, to limit the current parameter. Alternatively, the control signal is used to limit a current passing through the at least one transistor to a corresponding standard current, to limit the current parameter.

In another possible implementation, the method further includes: receiving a feedback voltage indicating an output voltage, and controlling the at least one transistor based on the feedback voltage, to regulate the output voltage.

According to a fifth aspect, an embodiment of this application provides a terminal device, including the voltage regulation apparatus according to any one of the possible designs of the first aspect or the second aspect.

According to a sixth aspect, an embodiment of this application provides a chip, including the voltage regulation apparatus according to any one of the possible designs of the first aspect or the second aspect.

According to a seventh aspect, an embodiment of this application provides a current detection control device, including a processor and a memory. The memory is configured to store a program instruction. When the current detection control device runs, the processor executes the program instruction stored in the memory, to enable the current detection control device to perform the overcurrent protection method according to the third aspect or the fourth aspect.

In the technical solutions provided in embodiments of this application, because the current parameter can indicate the load current of the at least one transistor, after obtaining the current parameter of the power stage circuit, the current detection control circuit compares the current parameter with the plurality of preset overcurrent protection thresholds in the register configuration, to output the control signal based on the comparison result. Therefore, a limiting operation is performed on the current parameter based on the control signal. In this way, the current parameter can be limited to a criterion in which no thermal damage is caused to the component such as the chip, the transistor, or the inductor. Compared with an existing current limiting mechanism in which the current limiting is directly enabled when the current parameter is greater than the current limiting threshold, in this mechanism provided in embodiments of this application, the current parameter can be limited based on the dynamic threshold, and this mechanism is applicable to a scenario with a non-constant current load, meets a miniaturization trend of a terminal product, and avoids an over-design, to achieve good overcurrent protection effect.

DESCRIPTION OF EMBODIMENTS

Figure 1:
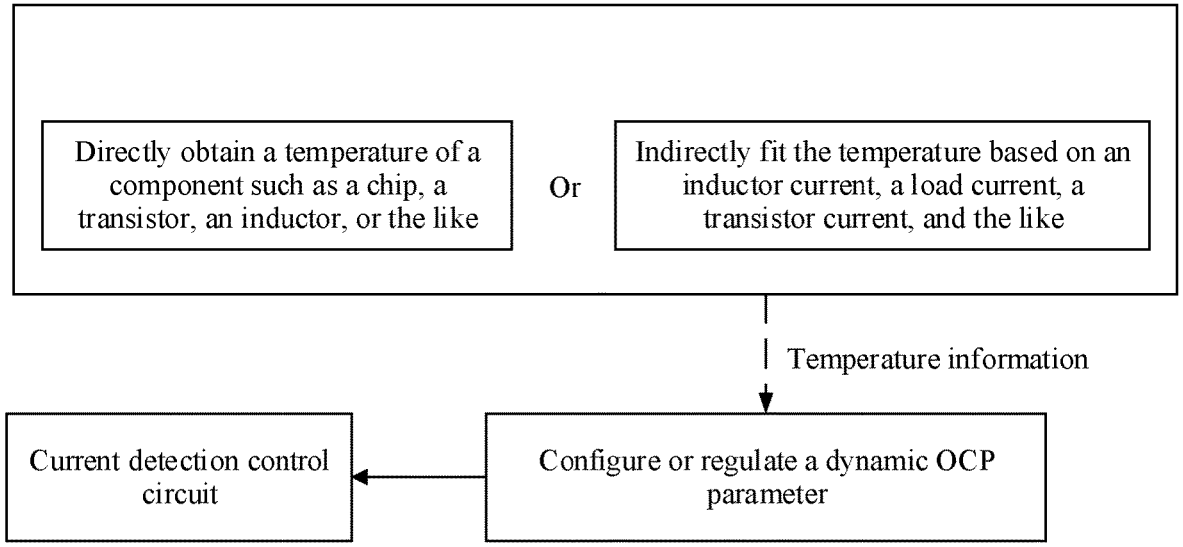
FIG. 1 is a schematic diagram of a framework for configuring an OCP parameter according to an embodiment of this application.

Embodiments of this application provide a voltage regulation apparatus and an overcurrent protection method, to limit a current parameter based on a dynamic threshold. This is applicable to a scenario with a non-constant current load, meets a miniaturization trend of a terminal product, and avoids an over-design, to achieve good overcurrent protection effect.

The following clearly describes the technical solutions in embodiments of this application with reference to the accompanying drawings in embodiments of this application. It is clear that the described embodiments are some but not all of embodiments of this application. All other embodiments obtained by persons of ordinary skill in the art based on embodiments of this application without creative efforts shall fall within the protection scope of this application.

In the specification, claims, and accompanying drawings of this application, the terms "first", "second", "third", "fourth", and so on (if existent) are intended to distinguish between similar objects but do not necessarily indicate a specific order or sequence. It should be understood that the data termed in such a way are interchangeable in proper circumstances so that the embodiments of this application described herein can be implemented in orders except the order illustrated or described herein. In addition, the terms "include" and "have" and any other variants are intended to cover the non-exclusive inclusion. For example, a process, method, system, product, or device that includes a list of steps or units is not necessarily limited to those expressly listed steps or units, but may include other steps or units not expressly listed or inherent to such a process, method, product, or device.

To resolve a problem of an obvious over-design in an existing overcurrent protection solution because a fixed current limiting threshold is currently used as a boundary value of overcurrent protection, embodiments of this application provide a voltage regulation apparatus and an overcurrent protection method. The following describes in detail the voltage regulation apparatus and the overcurrent protection method provided in embodiments of this application.

The technical solutions in embodiments of this application may be applied to various voltage regulation apparatuses. For example, the voltage regulation apparatus may include at least one of the following: an LDO circuit, a buck converter circuit (referred to as a BUCK circuit), a buck-boost converter circuit (referred to as a BUCK-BOOST circuit), and a boost converter circuit (referred to as a BOOST circuit). The voltage regulation apparatus may further include another voltage regulation circuit that needs to implement overcurrent protection. This is not limited herein. In addition, the voltage regulation apparatus provided in embodiments of this application is applicable to various communication devices. For example, the voltage regulation apparatus is applicable to a terminal device and a network device. For example, the voltage regulation apparatus on the terminal device may use the voltage regulation apparatus provided in embodiments of this application, and implement overcurrent protection.

To implement a dynamic OCP solution based on a dynamic overcurrent protection (overcurrent protection, OCP) mechanism, in this embodiment of this application, temperature information may be obtained, to dynamically configure an OCP parameter based on the temperature information. Therefore, the dynamically configured OCP parameter can lay a foundation for implementing overcurrent protection. System heat information may be obtained in at least one of a direct obtaining manner and an indirect obtaining manner. FIG. 1 is a schematic diagram of a framework for configuring an OCP parameter according to an embodiment of this application. As shown in FIG. 1, the indirect obtaining manner described above may be understood as: after a current parameter such as an inductor current, a load current, or a transistor current is obtained, temperature information is obtained through fitting based on the current parameter. Alternatively, a temperature of a component such as a chip, a transistor, or an inductor may be directly obtained, to directly obtain temperature information, to implement dynamic configuration of the OCP parameter. In this way, the dynamically configured OCP parameter is used as a protection threshold for overcurrent protection, so that a current detection control circuit can implement overcurrent protection based on the dynamically configured OCP parameter. It may be understood that the temperature information may also indicate the system heat information. Specifically, the OCP parameter may also be dynamically configured based on the system heat information. This is not limited in this embodiment.

It should be noted that the OCP parameter described above includes at least one of the following parameters: a current limiting threshold Ia, an over-limit duration threshold Tmax, a controlled duration threshold Tx, and the like. Details are described in subsequent embodiments of this application.

1. Describe a Dynamic Configuration Process of the OCP Parameter and an Overcurrent Protection Scheme from a Perspective of Indirectly Obtaining the Temperature Information.

Figure 2:
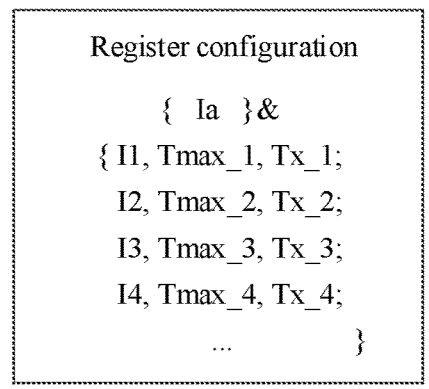
FIG. 2 is a schematic diagram of a dynamic protection threshold according to an embodiment of this application.

To limit a current parameter of a power stage circuit based on a dynamic protection threshold, FIG. 2 is a schematic diagram of a dynamic protection threshold according to an embodiment of this application. It can be learned from FIG. 2 that the OCP parameters such as over-limit duration thresholds and controlled duration thresholds that respectively correspond to a plurality of preset overcurrent protection thresholds, the current limiting threshold Ia, and the plurality of preset overcurrent protection thresholds are preconfigured in register configuration. The plurality of preset overcurrent protection thresholds are all greater than the current limiting threshold Ia. For example, a preset overcurrent protection threshold I1 corresponds to an over-limit duration threshold Tmax_1 and a controlled duration threshold Tx_1. A preset overcurrent protection threshold I2 corresponds to an over-limit duration threshold Tmax_2 and a controlled duration threshold Tx_2. By analogy, a preset overcurrent protection threshold In corresponds to an over-limit duration threshold Tmax_n and a controlled duration threshold Tx_n.

It should be understood that n described above should be a positive integer, and the preset overcurrent protection threshold In>I(n-1). In addition, for the OCP parameter in FIG. 2, it should be further noted that the OCP parameter for performing overcurrent protection on an inductor may be configured based on the inductor current. In an actual application, the OCP parameter for performing overcurrent protection on a transistor may be configured based on heating of the transistor. Alternatively, an OCP parameter for performing overcurrent protection on a chip or the like is configured based on heating of the chip or the like. This is not specifically limited in this embodiment of this application. A specific parameter configuration process may be determined by persons skilled in the art. The configured OCP parameter shown in FIG. 2 may be stored in a memory corresponding to the voltage regulation apparatus. The memory includes but is not limited to a nonvolatile memory or a volatile memory, for example, may be the register described above. At each startup, the OCP parameter may be read from a nonvolatile memory and input to the register.

Figure 3:
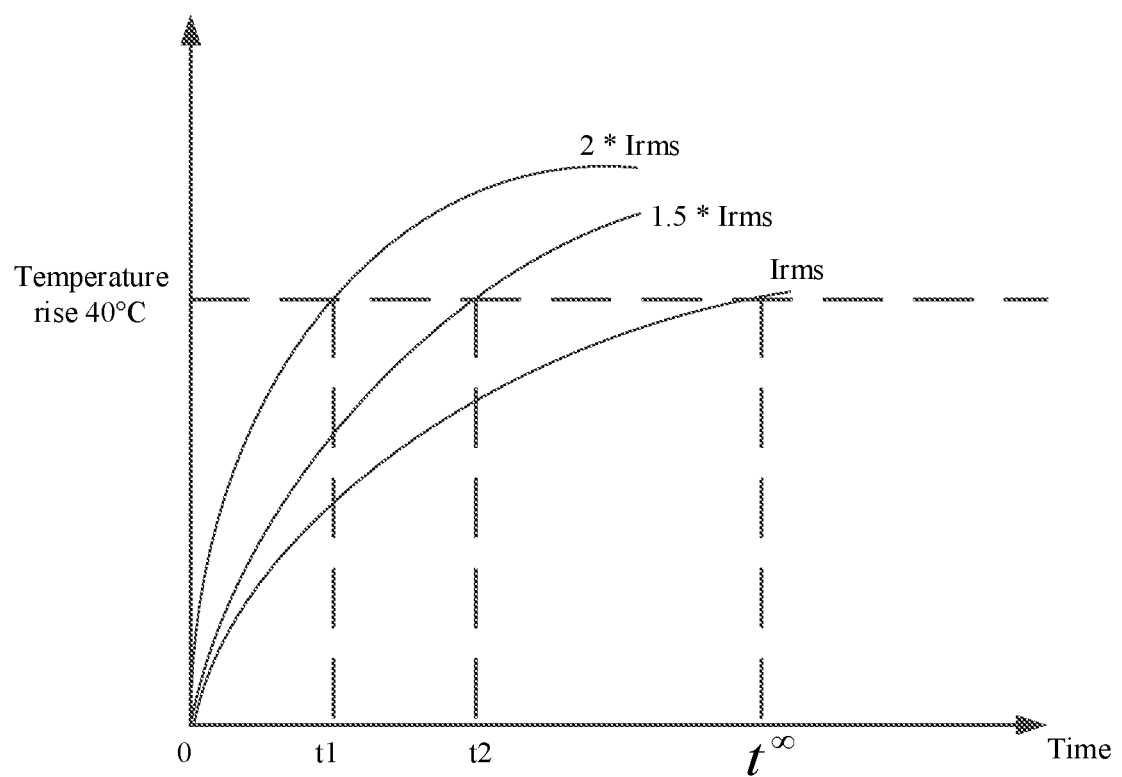
FIG. 3 is a schematic diagram of a temperature rise characteristic of an inductor according to an embodiment of this application.

An inductor is used as an example. FIG. 3 is a schematic diagram of a temperature rise characteristic of the inductor according to an embodiment of this application. Based on a heat balance principle, when a current passing through the inductor exceeds a temperature rise current specification, an actual temperature rise of the inductor has response time. In addition, the response time correspondingly decreases as a valid current (Irms) flowing through the inductor increases.

Therefore, Tmax_n corresponding to the preset overcurrent protection threshold In is less than Tmax_(n-1), and Tx_n corresponding to the preset overcurrent protection threshold In is less than Tx_(n-1).

Figure 4:
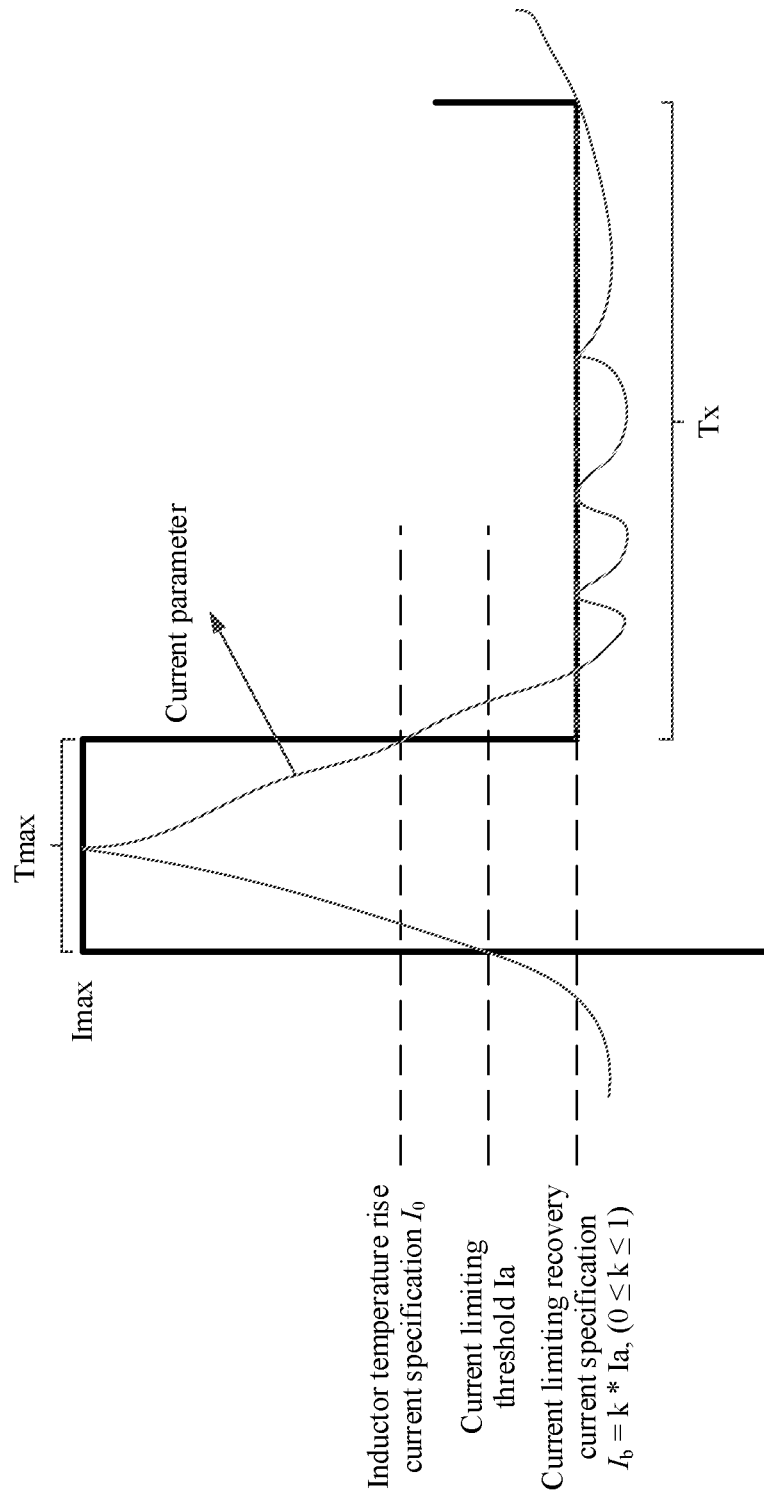
FIG. 4 is a schematic diagram of fitting a load current model by using a square wave according to an embodiment of this application.

In addition, FIG. 4 is a schematic diagram of fitting a load current model by using a square wave according to an embodiment of this application. Based on the load current model fit by using the square wave and a definition of the temperature rise current ($I_0$) shown in FIG. 4, the following relationship can be derived from the heat balance principle:

$$I_o^2 \times (Tmax+Tx) = I_{max}^2 \times Tmax + I_b^2 \times Tx$$

By combining the foregoing relationship with Tx=x× Tmax, Imax=m×$I_0$, and $I_b$=a×$I_0$, it can be deduced that:

$$x = \frac{m^2 - 1}{1 - a^2}.$$

Imax is a peak current limiting value. The over-limit duration threshold Tmax is a duration in which the peak current limiting value exceeds the current limiting threshold Ia. The controlled duration threshold Tx is a duration in which the current passing through the inductor needs to be limited when the current is at a peak. $I_b$ is a current limiting recovery current specification. Imax>$I_b$, and coefficients m and a are preset constants. After the coefficients m and a are discretized, x can form a plurality of overcurrent protection levels, to obtain the OCP parameter configured in the foregoing FIG. 2.

For example, the plurality of preset overcurrent protection thresholds and the corresponding duration are understood with reference to the following Table 1.

TABLE 1

| Peak current limiting (m) | Over-limit duration threshold Tmax | Controlled duration threshold Tx | a = 0.8 |
|---|---|---|---|
| 1 | Infinity | No control | 0.8 |
| 1.1 | Tmax_1 | Tx_1 = 0.58 × Tmax_1 | 0.8 |
| 1.2 | Tmax_2 | Tx_2 = 1.22 × Tmax_2 | 0.8 |
| 1.3 | Tmax_3 | Tx_3 = 1.92 × Tmax_3 | 0.8 |
| 1.4 | Tmax_4 | Tx_4 = 2.67 × Tmax_4 | 0.8 |
| 1.5 | Tmax_5 | Tx_5 = 3.47 × Tmax_5 | 0.8 |
| 1.6 | Tmax_6 | Tx_6 = 4.33 × Tmax_6 | 0.8 |
| 1.7 | Tmax_7 | Tx_7 = 5.25 × Tmax_7 | 0.8 |
| 1.8 | Tmax_8 | Tx_8 = 6.22 × Tmax_8 | 0.8 |
| 1.9 | Tmax_9 | Tx_9 = 7.25 × Tmax_9 | 0.8 |
| 2 | Tmax_10 | Tx_10 = 8.33 × Tmax_10 | 0.8 |

It may be understood that the values provided in Table 1 are merely described as examples, and may be optimized based on a load behavior in an actual application. In addition, FIG. 3 and FIG. 4 merely describe configuration of the OCP parameter in FIG. 2 by using the inductor as an example. This is not limited herein.

Therefore, in this embodiment of this application, the over-limit duration thresholds and the controlled duration thresholds that respectively correspond to the plurality of preset overcurrent protection thresholds, the current limiting threshold Ia, and the plurality of preset overcurrent protection thresholds may be preconfigured in the register. These parameters are applied to a current detection control circuit.

Figure 5:
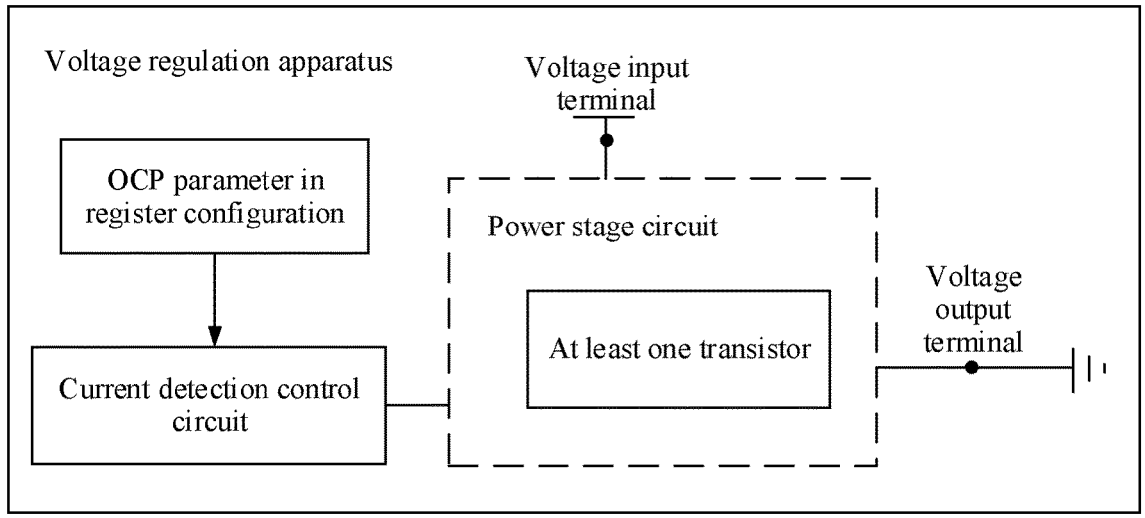
FIG. 5 is a schematic diagram of a structure of a voltage regulation apparatus according to an embodiment of this application.

In view of this, FIG. 5 is a schematic diagram of a framework of the voltage regulation apparatus according to an embodiment of this application. The voltage regulation apparatus may include a current detection control circuit, a power stage circuit, a voltage input terminal, and a voltage output terminal. An out terminal of the current detection control circuit is connected to an input terminal of the power stage circuit. The power stage circuit may include at least one transistor. The current detection control circuit is configured to: obtain a current parameter of the power stage circuit, where the current parameter indicates a current of the at least one transistor; and compare the current parameter with a plurality of preset overcurrent protection thresholds, to output a control signal. The control signal is used to limit the current parameter. The voltage input terminal is mainly configured to receive an input voltage Vin. The voltage output terminal is configured to form an output voltage Vout.

In this embodiment, because the current parameter can indicate a load current of the at least one transistor, after obtaining the current parameter of the power stage circuit, the current detection control circuit mainly compares the current parameter with the plurality of preset overcurrent protection thresholds configured in a register. This comparison result indicates two overcurrent protection thresholds between which the load current is located in the plurality of preset overcurrent protection thresholds, so that the two overcurrent protection thresholds are used as thresholds for enabling current limiting. In this way, the control signal output by the current detection control circuit can limit the current parameter. The load current of the at least one transistor indicates a value of a current flowing through the at least one transistor.

Optionally, in some other embodiments, an action of limiting the current parameter by the foregoing current detection control circuit based on the control signal may further include but is not limited to controlling an on/off state of at least one transistor based on the control signal, for example, turning off the at least one transistor. Alternatively, the current passing through the at least one transistor may be limited to a corresponding standard current based on the control signal, that is, a value of the load current of the at least one transistor is restored to a corresponding standard value, to limit the current parameter. The foregoing corresponding standard current is a current that can ensure that no thermal damage is generated to a component such as a chip, a transistor, or an inductor. In an actual application, there may be another manner to limit the current parameter. This is not specifically limited in this embodiment of this application.

Figure 6:
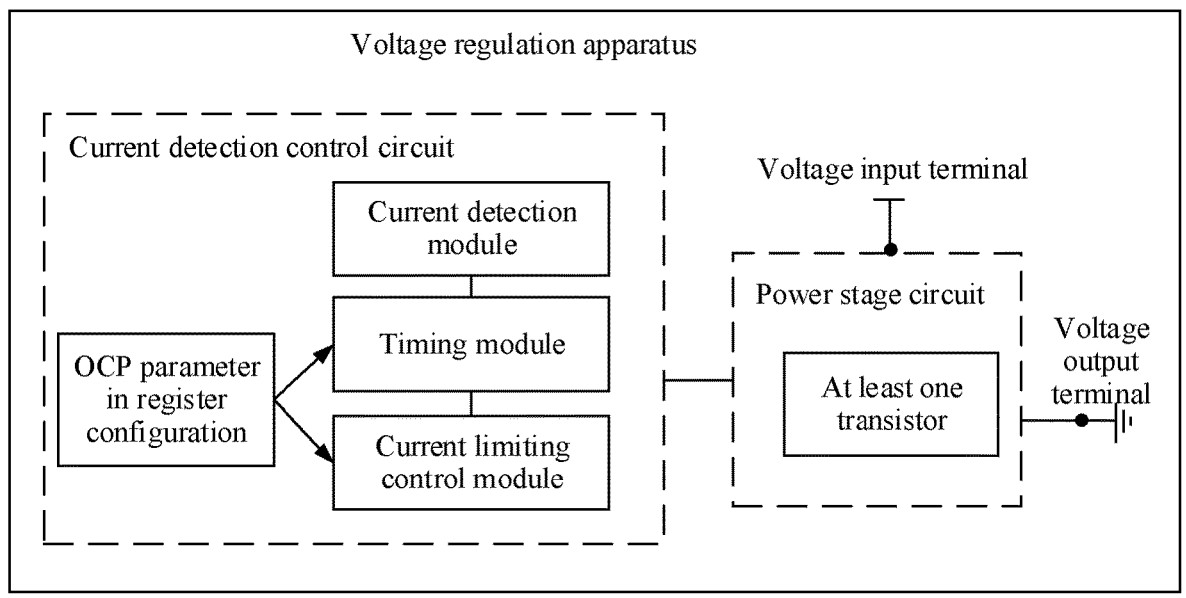
FIG. 6 is a schematic diagram of another structure of a voltage regulation apparatus according to an embodiment of this application.

Optionally, based on the embodiment described in FIG. 5, in some other embodiments, FIG. 6 is a schematic diagram of another structure of the voltage regulation apparatus according to an embodiment of this application. The current detection control circuit may include a current detection module, a timing module, and a current limiting control module. It should be understood that modules in this embodiment and subsequent embodiments each include a circuit structure, and may be implemented by using an analog circuit, a digital circuit, or a combination of an analog circuit and a digital circuit. For specific implementation, refer to subsequent embodiments. The current detection module is configured to perform current detection on at least one transistor, to obtain the current parameter of the power stage circuit. The current parameter can indicate the current of the at least one transistor. The current detection module may be a galvanometer that detects and counts the current. The current limiting control module is configured to compare the current parameter with a current limiting threshold. The timing module is configured to count a first duration when the current limiting control module determines, through comparison, that the current parameter is greater than or equal to the current limiting threshold. The first duration is a duration in which the current parameter is greater than or equal to the current limiting threshold. The timing module may be a timer of a circuit structure. The current limiting control module is configured to: compare the current parameter with the plurality of preset overcurrent protection thresholds to obtain the comparison result, where the comparison result indicates two overcurrent protection thresholds between which the load current is located, that is, indicates a level of the load current; and select, based on the comparison result, a target over-limit duration threshold from a plurality of over-limit duration thresholds corresponding to the plurality of preset overcurrent protection thresholds, and output the control signal when the first duration is greater than the target over-limit duration threshold.

It may be understood that, because the current parameter I can indicate the load current of at least one transistor, the current detection module needs to perform current detection on the at least one transistor, to obtain the current parameter of the power stage circuit.

Specifically, a manner in which the current detection module obtains the current parameter of the power stage circuit includes but is not limited to collecting the current of the at least one transistor by detecting a field effect transistor (sensefet), or collecting a load voltage of the at least one transistor, and calculating the load current of the at least one transistor based on an on resistance of the at least one transistor. The foregoing current parameter is indicated by the load current of the at least one transistor. For example, in an LDO circuit, the current parameter may be a valid value or the like of a load current of a transistor. Alternatively, in a switch power supply such as a BUCK circuit, a BOOST circuit, or a BUCK-BOOST circuit, because at least one transistor may include at least one upper transistor and at least one lower transistor, the current parameter may alternatively be an average value, that is, an average load current, of a load current of the at least one upper transistor and a load current of the at least one lower transistor, or the current parameter may also be a valid value related to a load current of the at least one upper transistor and a load current of the at least one lower transistor, or the like. The valid value may be one of the load current of the at least one upper transistor and the load current of the at least one lower transistor, or a comprehensive value obtained through calculation based on the two load currents. This is not specifically limited in this embodiment of this application.

In this way, after obtaining the current parameter, the current detection module may send the current parameter I to the timing module and the current limiting control module. It can be learned from the content described in FIG. 2 that the plurality of preset overcurrent protection thresholds are all greater than the current limiting threshold Ia, and based on a heat balance principle, when reliability of a peripheral component such as a chip, an inductor, or a transistor is ensured, when the current parameter I is greater than or equal to the current limiting threshold Ia, the load current continues to work for a period of time, rather than directly enabling current limiting as that in an existing current limiting mechanism. Therefore, after obtaining the current parameter I, the timing module first compares the current parameter I with Ia, and when I≥Ia, counts a duration in which the load current can still work, that is, calculates the first duration, and records the first duration as t.

In this case, the current limiting control module may monitor the first duration counted by the timing module in real time, receive the current parameter of the current detection module, compare the current parameter with the plurality of preset overcurrent protection thresholds in the register configuration, select, based on the comparison result, the target over-limit duration threshold from the plurality of over-limit duration thresholds corresponding to the plurality of preset overcurrent protection thresholds, and output the control signal when the first duration is greater than the target over-limit duration threshold. In this embodiment, the target over-limit duration threshold is used as a threshold for enabling current limiting. In this way, the control signal output by the current limiting control module can limit the current parameter. Compared with the existing current limiting mechanism in which current limiting is directly enabled when I≥Ia, in this mechanism, the current parameter can be limited based on the dynamic threshold, and this mechanism is applicable to a scenario with a non-constant current load, meets a miniaturization trend of a terminal product, and avoids an over-design.

For example, it is assumed that Ia=5 A described in FIG. 2, the configured plurality of preset overcurrent protection thresholds, over-limit duration thresholds, and controlled duration thresholds are respectively shown in Table 2:

TABLE 2

| Preset overcurrent protection threshold | | |
|---|---|---|
| I1 = 5.5 A | Over-limit duration threshold | Tmax_1 = 4 s |
| | Controlled duration threshold | Tx_1 = 3 s |
| I2 = 6 A | Over-limit duration threshold | Tmax_2 = 3 s |
| | Controlled duration threshold | Tx_2 = 2 s |
| I3 = 7 A | Over-limit duration threshold | Tmax_3 = 1 s |
| | Controlled duration threshold | Tx_3 = 500 ms |
| ... | Over-limit duration threshold | ... |
| | Controlled duration threshold | ... |

If the current parameter I=6.5 A, it can be clearly seen that I>Ia. It is assumed that the first duration t monitored by the current limiting control module in this case is 1.5 s, it indicates that a duration in which I=6.5 A>Ia=5 A is 1.5 s. It can be seen with reference to Table 2 that, the preset overcurrent protection thresholds closest to I=6.5 A are I2=6 A and I3=7 A, that is, I2<I<I3, which indicates that a level of I is between I2 and I3. In this case, the current limiting control module may select, based on I2<I<I3, the target over-limit duration threshold Tmax_3 from the over-limit duration thresholds that respectively correspond to I2 and I3, that is, Tmax_3=1 s.

In this way, the current limiting control module compares monitored t with Tmax_3, and outputs the control signal when t≥Tmax_3. It is clear that t=1.5 s>Tmax_3=1 s, which indicates that when I=6.5 A is greater than Ia=5 A, the over-limit duration threshold in which the load current can continuously work in a practical application is 1 s. Once the duration is greater than 1 s, due to heat accumulation, components such as chips and power inductors may be burnt to a great extent. It may be understood that t may be counted in real time, that is, the current limiting control module may enable current limiting when t counted by the timing module reaches 1 s, and does not need to wait for 1.5 s to start processing. A specific example in this embodiment is merely for ease of understanding the solution.

It should be noted that the foregoing values, such as t, I, Ia, the plurality of preset overcurrent protection thresholds, the over-limit duration threshold and the controlled duration threshold are merely example descriptions in this embodiment of this application, and may be other values in an actual application. This is not specifically limited in this embodiment of this application. In addition, the preset overcurrent protection threshold closest to I described above may also be equal to I, for example, I(n−1)≤I≤In. This is not specifically limited in this embodiment of this application.

Optionally, because a temperature can affect an over-limit duration in which the load current continuously works, the over-limit duration threshold may be further dynamically set based on the temperature.

Figure 7:
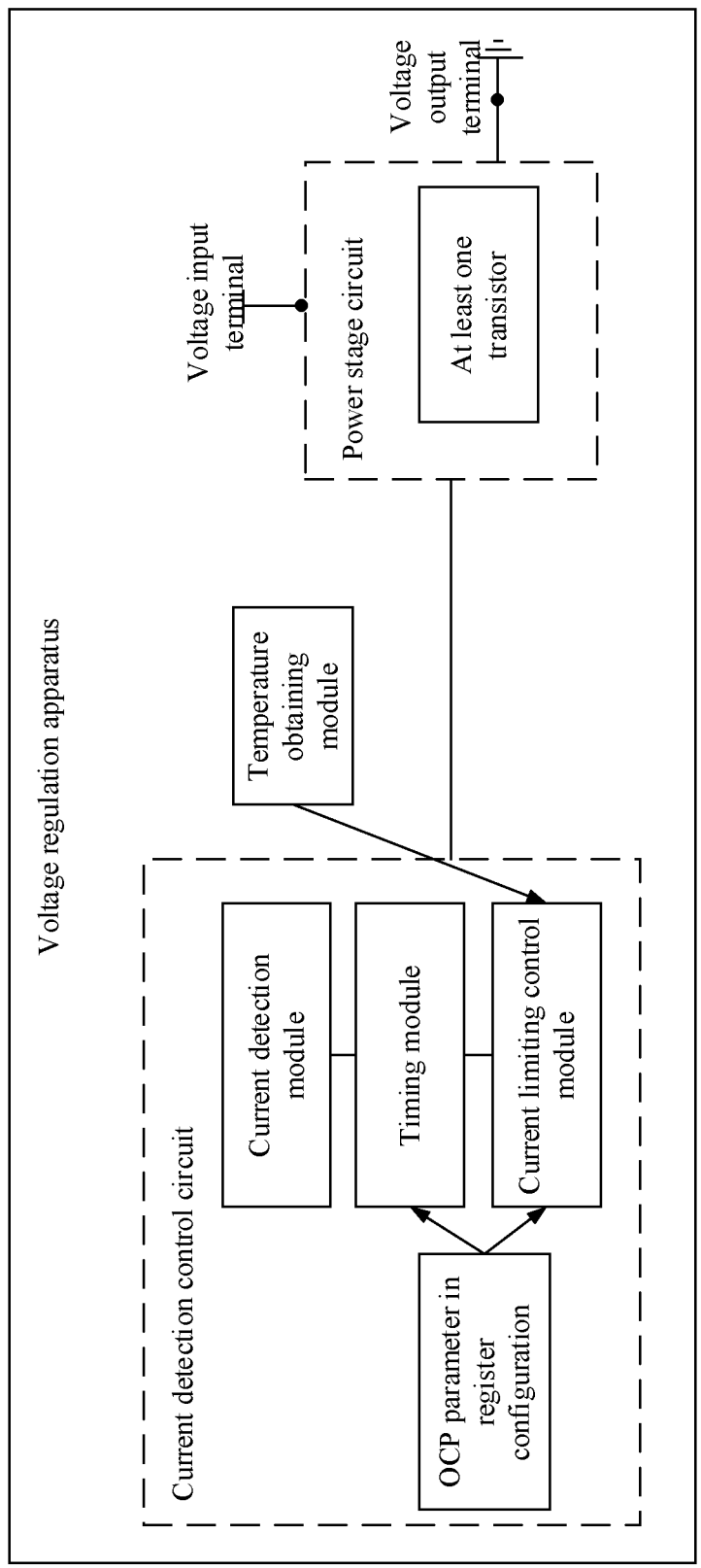
FIG. 7 is a schematic diagram of another structure of a voltage regulation apparatus according to an embodiment of this application.

Therefore, in some other embodiments, FIG. 7 is a schematic diagram of another structure of the voltage regulation apparatus according to an embodiment of this application. The voltage regulation apparatus further includes a temperature obtaining module. The temperature obtaining module is configured to obtain the temperature information. The current limiting control module is further configured to set each of the plurality of over-limit duration thresholds to a second duration based on the temperature information. The plurality of over-limit duration thresholds decrease as the temperature indicated by the temperature information increases, and increase as the temperature indicated by the temperature information decreases. The plurality of over-limit duration thresholds correspond to the plurality of preset overcurrent protection thresholds. It may be understood that each of the plurality of over-limit duration thresholds in the register configuration is set based on the temperature information, so that the over-limit duration threshold obtained after the setting can be used to compare with the foregoing first duration, and the current limiting control module can more flexibly predetermine whether the current limiting is enabled.

It should be noted that the foregoing temperature information includes at least one of the following: ambient temperature information, and temperature information of components such as a chip, a transistor, and an inductor. This is not specifically limited in this embodiment of this application.

The ambient temperature information is used as an example. It is assumed that the plurality of preset overcurrent protection thresholds, the plurality of over-limit duration thresholds, and the like described in Table 2 are thresholds configured when the ambient temperature information shows that the ambient temperature is 25° C. In this case, when the temperature information obtained by the temperature obtaining module shows that a current ambient temperature is 5° C., the over-limit duration threshold of the load current should also be allowed to be accordingly extended. For example, the current limiting control module regulates, based on the temperature information, the over-limit duration threshold corresponding to the current parameter of 7 A from 1 s to 2 s. Based on the example listed in Table 2, even if the current limiting control module determines that the level of I is between I2 and I3, it can be clearly learned that the first duration t=1.5 s is less than the over-limit duration threshold Tmax_3=2 s obtained after the setting. In this way, the over-limit duration threshold corresponding to 7 A is also changed from is to 2 s. Therefore, performance of the inductor can be maximized by using the over-limit duration threshold compared with the original over-limit duration threshold Tmax_3=1 s corresponding to 7 A.

In addition, when the temperature information obtained by the temperature obtaining module shows that the current ambient temperature is 40° C., the over-limit duration threshold of the load current should also be allowed to be accordingly reduced, for example, the current limiting control module regulates, based on the temperature information, the over-limit duration threshold corresponding to the current parameter of 6 A from 2 s to 0.5 s. This is not specifically limited in this embodiment of this application.

Figure 8A:
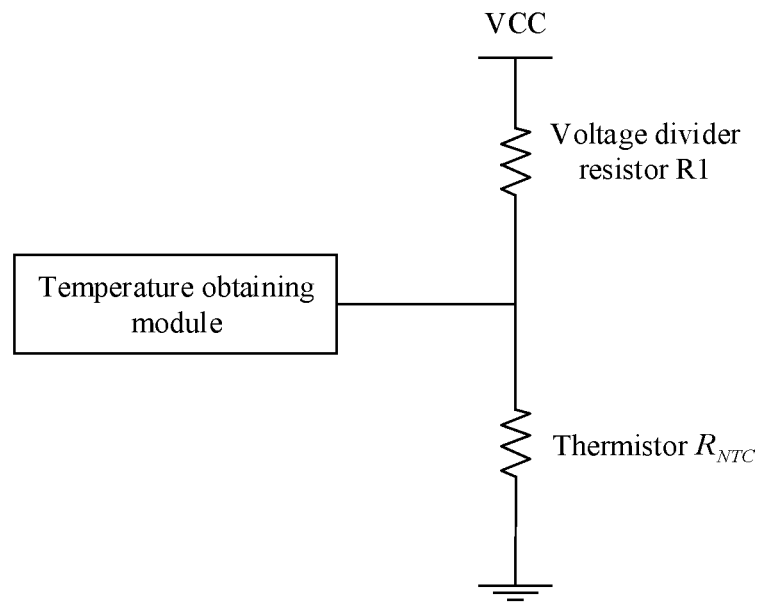
FIG. 8a is a schematic diagram for obtaining first current ambient temperature information according to an embodiment of this application.

An obtaining manner in which the temperature obtaining module obtains the temperature information may also be understood with reference to the following manner:

A first manner: FIG. 8a is a schematic diagram of obtaining the temperature information according to an embodiment of this application. It can be seen from FIG. 8a that the voltage regulation apparatus further includes a voltage divider resistor and a thermistor. A connection point between the voltage divider resistor and the thermistor is connected to an input terminal of the current detection control circuit. Based on the connection manner in FIG. 8a, the temperature obtaining module may obtain the temperature information based on a voltage between the voltage divider resistor R1 and the thermistor $R_{NTC}$, and is specifically a converter circuit that converts the voltage into a digital or analog signal for indicating the temperature information. In other words, the thermistor $R_{NTC}$ varies with a temperature, so that the voltage can indicate the temperature information.

Figure 8B:
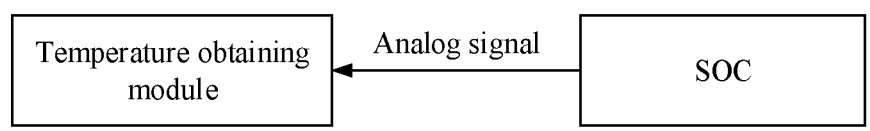
FIG. 8b is another schematic diagram for obtaining first current ambient temperature information according to an embodiment of this application.

A second manner: FIG. 8b is another schematic diagram of obtaining the temperature information according to an embodiment of this application. A SOC outside the voltage regulation apparatus obtains the temperature information, and sends the temperature information to the temperature obtaining module by using an analog signal. The temperature obtaining module in this embodiment is an analog interface circuit configured to receive the temperature information.

Figure 8C:
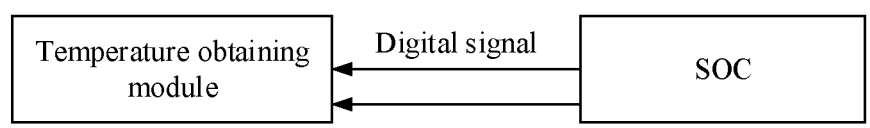
FIG. 8c is another schematic diagram for obtaining first current ambient temperature information according to an embodiment of this application.

A third manner: FIG. 8c is another schematic diagram of obtaining the temperature information according to an embodiment of this application. A SOC obtains first temperature information, and sends the temperature information to the temperature obtaining module by using a digital signal. The temperature obtaining module in this embodiment is a digital interface circuit configured to receive the temperature information.

It may be understood that, in this embodiment, the SOC may be considered as a device that receives an output voltage of the voltage regulation apparatus, that is, the SOC may be a load of the voltage regulation apparatus, or a load of the voltage regulation apparatus may be another component other than the SOC. This is not limited in this embodiment. In addition, the SOC may be configured to operate the voltage regulation apparatus, for example, set the output voltage or turn off the voltage regulation apparatus. This is not limited in this embodiment. For example, the SOC includes but is not limited to at least one of a processor, a communication unit, an image processing unit, an interface, a bus, and a memory.

For FIG. 8a to FIG. 8c, a frequency of collecting the temperature information may be set based on an actual requirement of a system. For the manners in which the SOC obtains the temperature information in FIG. 8b and FIG. 8c, refer to FIG. 8a. A difference lies in that the voltage divider resistor and the thermistor for detecting the temperature in FIG. 8a are built in the voltage regulation apparatus, while a voltage divider resistor and a thermistor for detecting the temperature in the solutions in FIG. 8b and FIG. 8c are built in the SOC.

In an actual application, in addition to the foregoing obtaining manners in FIG. 8a to FIG. 8c, the temperature obtaining module may further obtain the temperature information in another manner in the actual application. This is not specifically limited in this embodiment of this application.

Optionally, in some other embodiments, the current limiting control module is further configured to select, based on the comparison result, a target controlled duration threshold from a plurality of controlled duration thresholds corresponding to the plurality of preset overcurrent protection thresholds, and control, based on the target controlled duration threshold, limiting time in which the control signal limits the current parameter.

In other words, the current limiting control module compares the current parameter with the plurality of preset overcurrent protection thresholds, and selects, based on the comparison result, the target controlled duration threshold from the plurality of controlled duration thresholds corresponding to the plurality of preset overcurrent protection thresholds.

In this way, when the current limiting control module outputs the control signal to limit the current parameter, the control signal can further trigger a countdown, and control, based on the target controlled duration threshold, the limiting time in which the control signal limits the current parameter. After the countdown of the target controlled duration threshold is completed, the control signal is cleared, and the current parameter is no longer limited.

For example, based on the example described in FIG. 6, the preset overcurrent protection thresholds closest to I=6.5 A are I2=6 A and I3=7 A, that is, I2<I<I3, which indicates that the level of I is between I2 and I3. In this case, the current limiting control module may select, based on I2<I<I3, the target controlled duration threshold Tx_3 from the controlled duration thresholds which respectively correspond to I2 and I3, that is, Tx_3=500 ms. Countdown control is performed, based on Tx_3=500 ms, on the limiting time in which the control signal limits the current parameter. When the target controlled duration threshold Tx_3 counts down from 500 ms to 0 s, the control signal is no longer used to limit the current parameter. Therefore, the controlled duration threshold indicates a time period in which current limiting needs to be performed.

Figure 9:
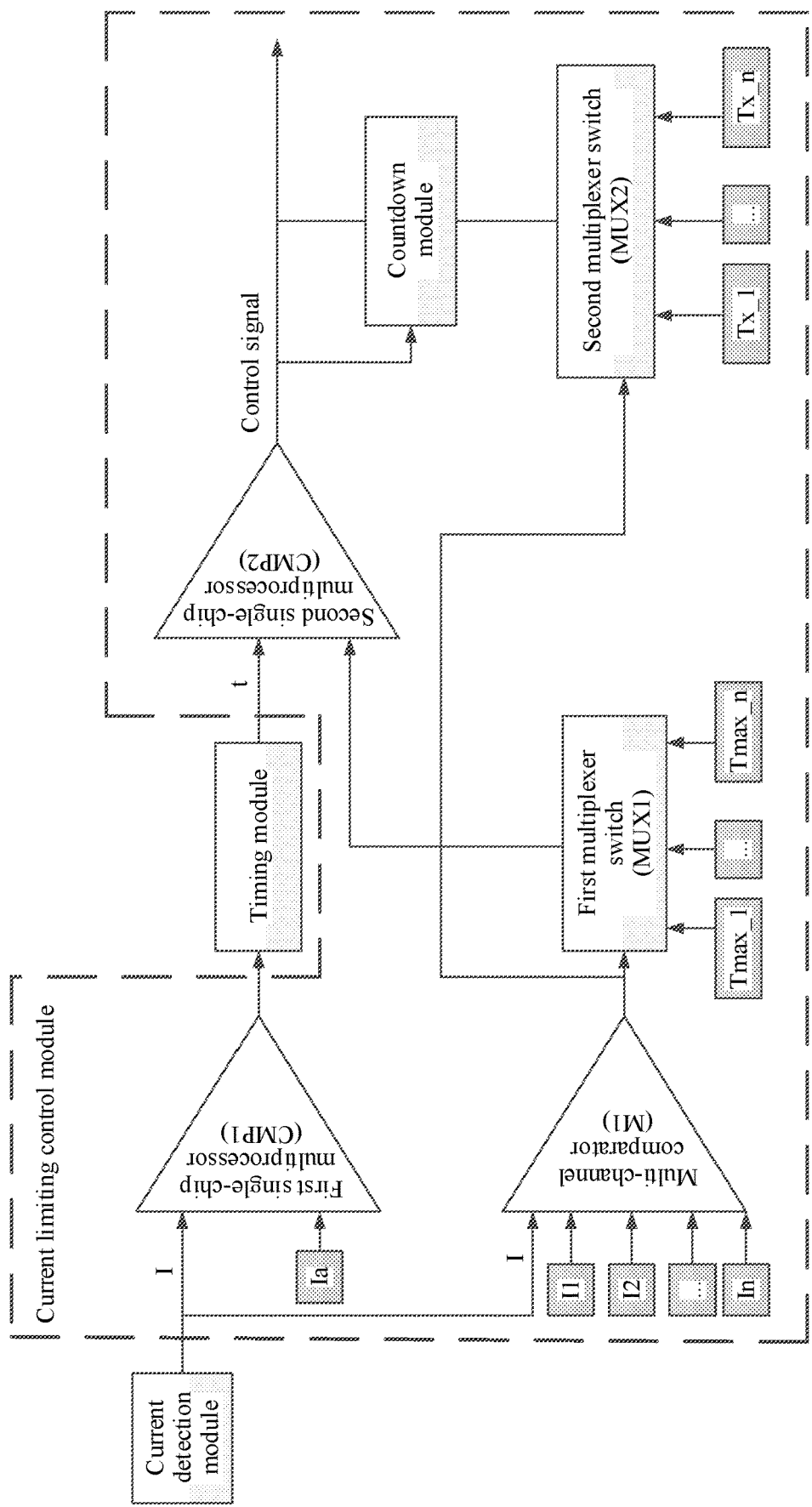
FIG. 9 is a schematic diagram of a current limiting control module according to an embodiment of this application.

Specifically, FIG. 9 is a schematic diagram of the current limiting control module according to an embodiment of this application. The current limiting control module may include: a first single-chip multiprocessor, a multi-channel comparator, a first multiplexer switch, a second multiplexer switch, a second single-chip multiprocessor, and a countdown module.

The multi-channel comparator is configured to compare the current parameter obtained by the current detection module with the plurality of preset overcurrent protection thresholds to obtain the comparison result, that is, obtain a result of two preset overcurrent protection thresholds between which the load current indicated by the current parameter is located. The first multiplexer switch is configured to: after receiving the comparison result, select, based on the comparison result, the target over-limit duration threshold from the plurality of over-limit duration thresholds corresponding to the plurality of preset overcurrent protection thresholds. The second single-chip multiprocessor is configured to: compare the first duration obtained by the timing module with the target over-limit duration threshold selected by the first multiplexer switch, and output the control signal once the first duration is greater than or equal to the target over-limit duration threshold. The control signal can be used to control an on/off state of at least one transistor in the power stage circuit, to limit the current parameter. The second multiplexer switch is configured to: after receiving the comparison result, select, based on the comparison result, the target controlled duration threshold from the plurality of controlled duration thresholds corresponding to the plurality of preset overcurrent protection thresholds. The countdown module is configured to: after receiving the control signal and the target controlled duration threshold, perform countdown control on control time in which the control signal limits the current parameter based on the target controlled duration threshold. After the countdown of the target controlled duration threshold is completed, the control signal is cleared, and the current parameter is no longer limited.

In addition, the first single-chip multiprocessor (CMP1) in FIG. 9 is configured to: compare the current parameter I with the current limiting threshold Ia, and when I≥Ia, trigger the timing module to start counting the first duration.

It should be noted that content of gray parts shown in FIG. 9 is the OCP parameters described in FIG. 2. These parameters may come from the foregoing register. The register may be located in the voltage regulation apparatus. When the system is started, these parameters are read from an external nonvolatile memory to the register. Details are not described herein again. In addition, the current limiting control procedure described in FIG. 9 is merely an example description. In an actual application, another current limiting control procedure may be further included. Details are not limited in this embodiment.

Figure 10:
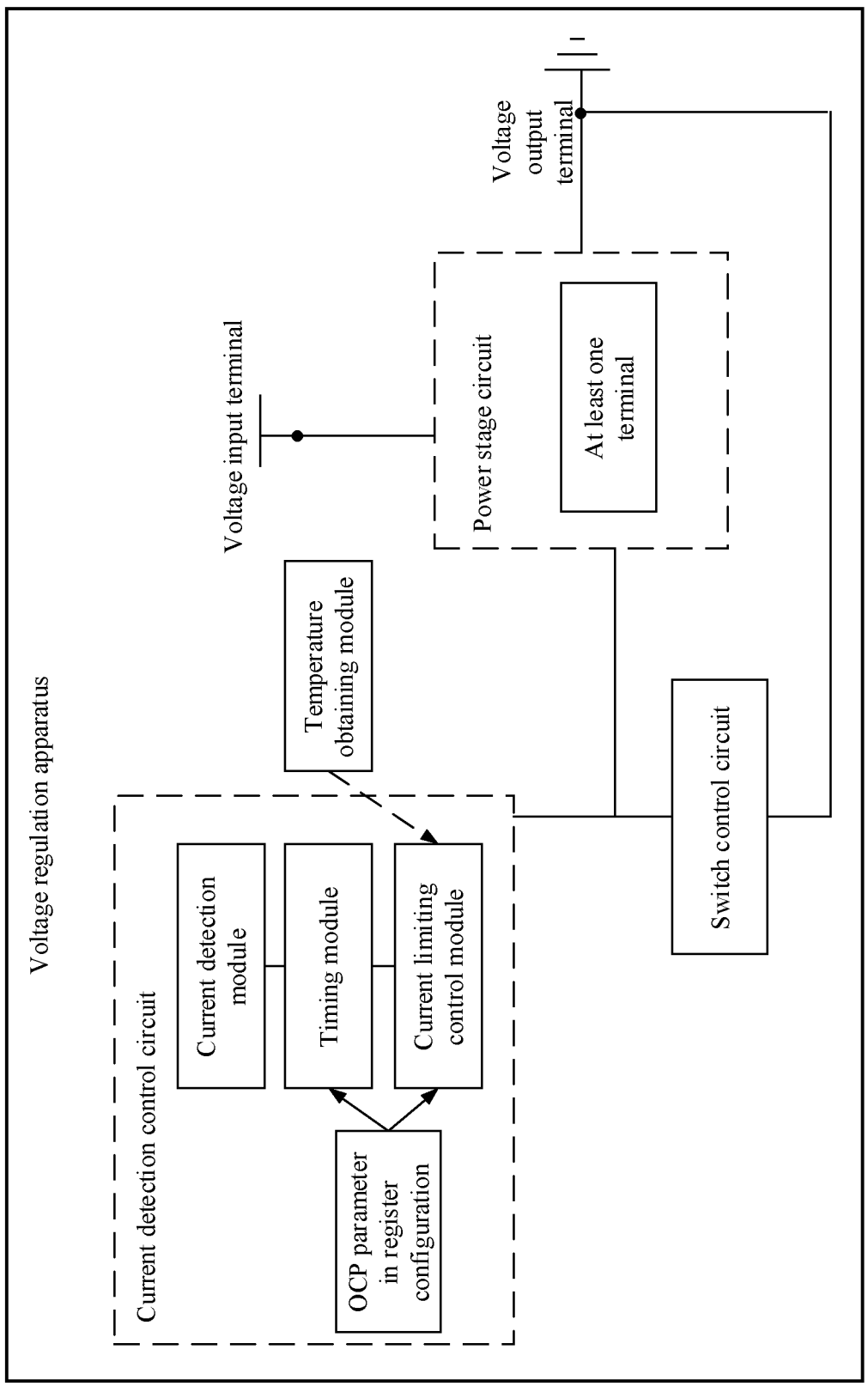
FIG. 10 is a schematic diagram of another structure of a voltage regulation apparatus according to an embodiment of this application.

Optionally, in some other embodiments of this application, FIG. 10 is a schematic diagram of another structure of the voltage regulation apparatus according to an embodiment of this application. It can be seen from FIG. 10 that the voltage regulation apparatus further includes a switch control circuit.

A connection point between an out terminal of the switch control circuit and the out terminal of the current detection control circuit is connected to the input terminal of the power stage circuit, and is configured to receive a feedback voltage indicating the output voltage, and control the at least one transistor based on the feedback voltage, to regulate the output voltage.

In this embodiment, the switch control circuit is connected to the power stage circuit and the voltage output terminal. The switch control circuit may collect the feedback voltage from the voltage output terminal, and output a switch control signal to the power stage circuit based on the feedback voltage. The feedback voltage is used to regulate the output voltage of the voltage output terminal.

It may be understood that there is an "AND gate" relationship between the switch control circuit and the current detection control circuit. After an "AND" operation is performed on the switch control circuit and the current detection control circuit, the at least one transistor is controlled. It should be noted that, once the current detection control circuit enables the foregoing current limiting, when the control signal is output to limit the current parameter to implement overcurrent protection, turn-on of the at least one transistor cannot be controlled by the switch control circuit based on the feedback voltage.

Figure 11:
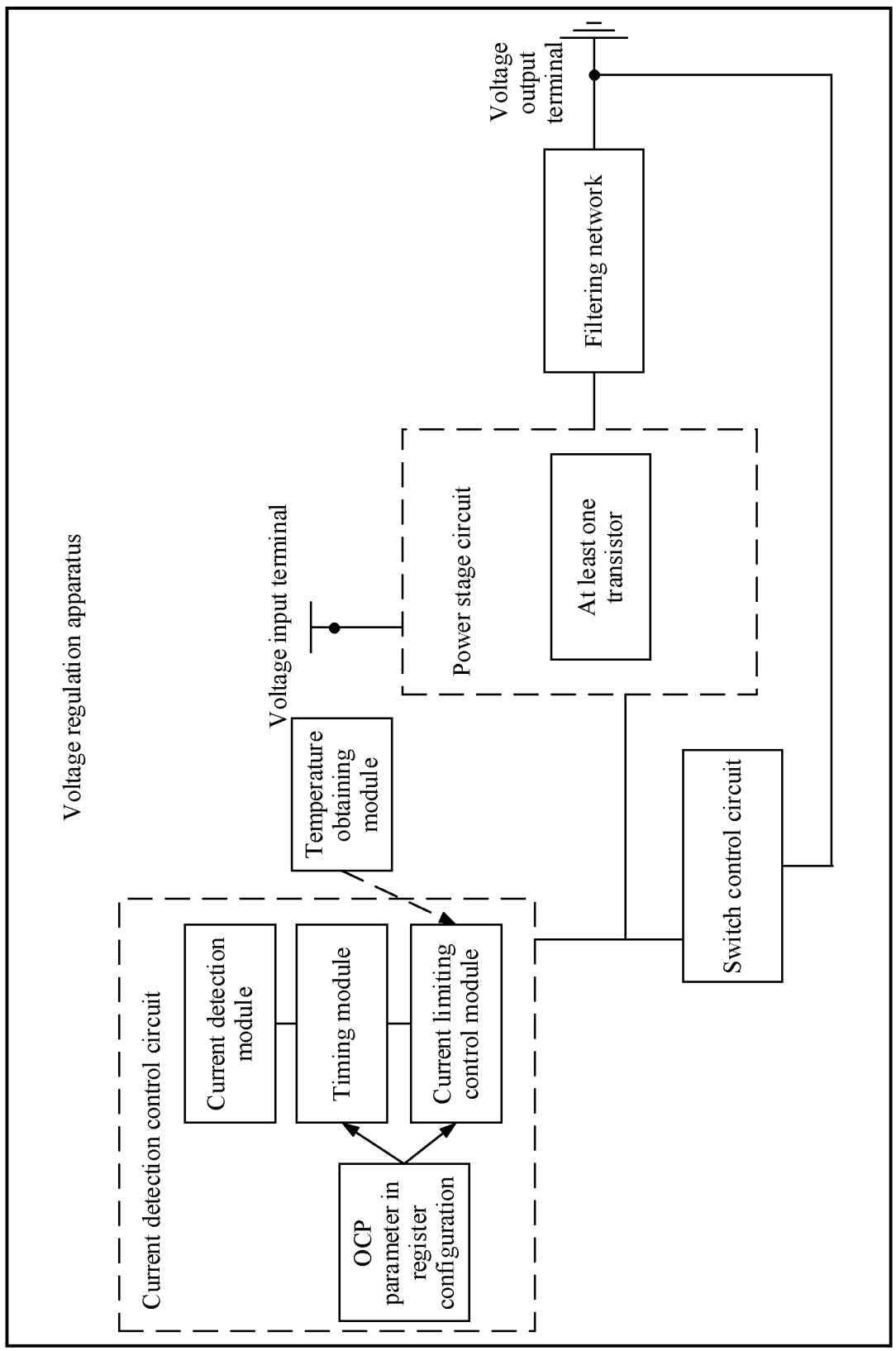
FIG. 11 is a schematic diagram of another structure of a voltage regulation apparatus according to an embodiment of this application.

Optionally, in some other embodiments of this application, FIG. 11 is a schematic diagram of another structure of the voltage regulation apparatus according to an embodiment of this application. It can be seen from FIG. 11 that the voltage regulation apparatus further includes a filtering network. The filtering network is coupled to the voltage output terminal or the voltage input terminal. In this embodiment, the filtering network includes an inductor L and a capacitor C. An input terminal of the filtering network is connected to an out terminal of the power stage circuit. The filtering network is mainly configured to filter the output voltage of the power stage circuit to obtain a regulated output voltage, that is, an output signal of an out terminal of the filtering network is the output voltage.

The foregoing voltage regulation apparatus described in FIG. 1 to FIG. 11 may include a switch power supply, an LDO circuit, and the like, and the switch power supply may further include a BUCK circuit, a BOOST circuit, a BUCK-BOOST circuit, an LDO circuit, and the like, to implement overcurrent protection. In this case, the following provides descriptions with reference to a circuit diagram.

Figure 12:
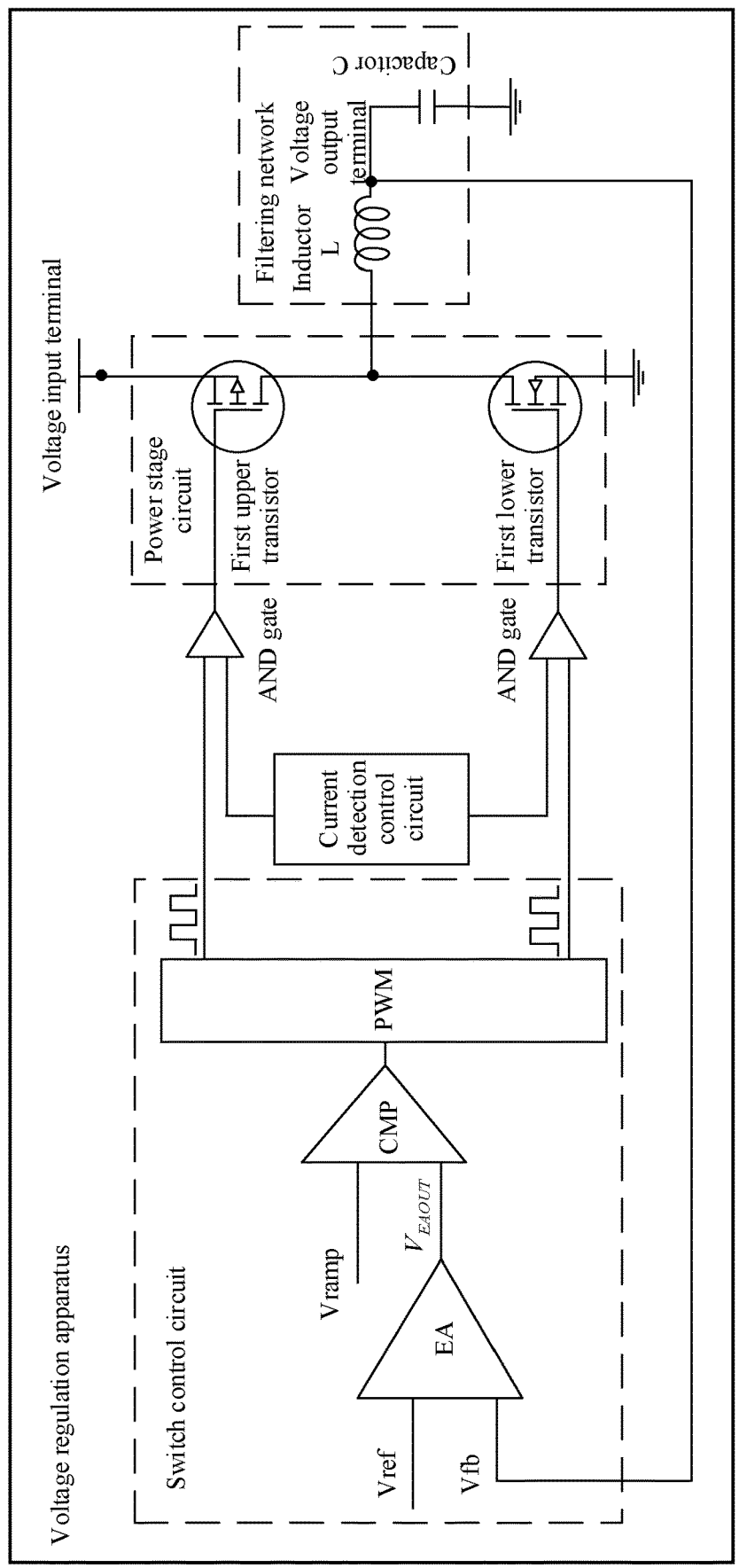
FIG. 12 is a schematic diagram of a structure in which a voltage regulation apparatus is applied to a BUCK circuit according to an embodiment of this application.

For example, the switch power supply is the BUCK circuit. FIG. 12 is a schematic diagram of a structure in which the voltage regulation apparatus is applied to the BUCK circuit according to an embodiment of this application. The following provides descriptions from a connection relationship between components in the BUCK circuit. The BUCK circuit may include the switch control circuit, the current detection control circuit, the power stage circuit, and the filtering network.

The switch control circuit includes an error amplifier (EA), a comparator (CMP), and a pulse width modulator (PWM). The filtering network includes the inductor L and the capacitor C. At least one transistor in the power stage circuit includes a first upper transistor and a first lower transistor. A gate of the first upper transistor is connected to an out terminal of the pulse width modulator PWM and the out terminal of the current detection control circuit by using an AND gate, a source of the first upper transistor is connected to the voltage input terminal, and a drain of the first upper transistor is coupled to the inductor L. A gate of the first lower transistor may be connected to the out terminal of the pulse width modulator PWM and the out terminal of the current detection control circuit by using an AND gate, a source of the first lower transistor is connected to a ground terminal, and a drain of the first lower transistor is coupled to the inductor L.

The error amplifier EA, the comparator CMP, and the pulse width modulator PWM described above may also be referred to as a control circuit of a voltage regulator. The error amplifier EA is connected to the voltage output terminal, and is mainly configured to output a $V_{EAOUT}$ signal after performing error amplification on the received feedback voltages Vfb and Vref. After the $V_{EAOUT}$ signal and a triangular wave signal are processed by the comparator CMP, a duty cycle square wave signal is output, that is, the PWM controls on/off states of the first upper transistor and the first lower transistor, to regulate the output voltage output by the filtering network.

It should be noted that the switch control circuit and the current detection control circuit are respectively connected to the first upper transistor and the first lower transistor by using the "AND gate" relationship. In addition, the current detection control circuit in FIG. 12 may be understood with reference to the content described in FIG. 5 to FIG. 9. Details are not described herein again.

It is further noted that, in addition to the example described in FIG. 12, in an actual application, a connection relationship of the first upper transistor in the foregoing BUCK circuit is as follows: the source of the first upper transistor may also be coupled to the filtering network, and the drain of the first upper transistor is connected to the voltage input terminal. This is not specifically limited in this embodiment of this application.

It should be understood that FIG. 12 is merely an example description of a connection relationship between the first transistor and the second transistor. Another connection relationship may be further included in this embodiment of this application. This is not specifically limited in this embodiment of this application.

Figure 13:
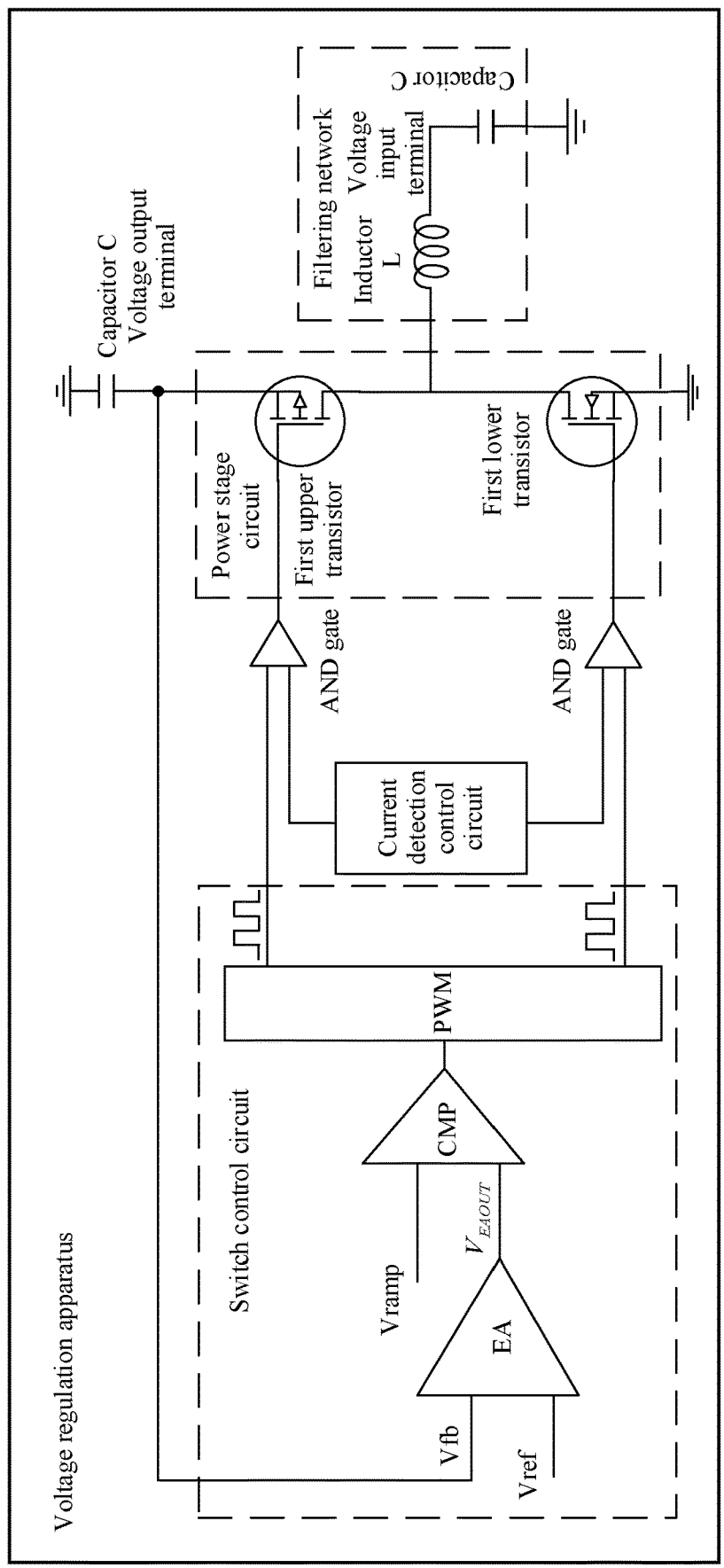
FIG. 13 is a schematic diagram of a structure in which a voltage regulation apparatus is applied to a BOOST circuit according to an embodiment of this application.

The foregoing mainly uses the BUCK circuit as an example for description. The following further describes the voltage regulation apparatus by using the BOOST circuit as an example. For example, the switch power supply is the BOOST circuit. FIG. 13 is a schematic diagram of a structure in which the voltage regulation apparatus is applied to the BOOST circuit according to an embodiment of this application. The following provides descriptions from a connection relationship between components in the BOOST circuit. The BOOST circuit may include the switch control circuit, the current detection control circuit, the power stage circuit, and the filtering network.

The at least one transistor in the power stage circuit includes a first upper transistor and a first lower transistor. A gate of the first upper transistor may be connected to an out terminal of a pulse width modulator PWM and the out terminal of the current detection control circuit by using an AND gate, a source of the first upper transistor is connected to the voltage output terminal, and a drain of the first upper transistor is coupled to an inductor L. A gate of the first lower transistor may be connected to the out terminal of the pulse width modulator PWM and the out terminal of the current detection control circuit by using an AND gate, a source of the first lower transistor is connected to a ground terminal, and a drain of the first lower transistor is coupled to the inductor L.

It should be noted that the switch control circuit and the current detection control circuit are respectively connected to the first upper transistor and the first lower transistor by using the "AND gate" relationship. In addition, an error amplifier EA, a comparator CMP, and the pulse width modulator PWM that are included in the switch control circuit in FIG. 13 may be understood with reference to the content described in FIG. 12. Details are not described herein again. In addition, the current detection control circuit in FIG. 13 may be understood with reference to the content described in FIG. 5 to FIG. 9. Details are not described herein again.

It should be understood that FIG. 13 is merely an example description of a connection relationship between the first transistor and the second transistor. Another connection relationship may be further included in this embodiment of this application. This is not specifically limited in this embodiment of this application.

It should be understood that a function of the first lower transistor in the BOOST circuit described in FIG. 13 is different from that of the first lower transistor in the BUCK circuit described in FIG. 12. In the BUCK circuit, the first lower transistor may obtain a current from the inductor L, however, in the BOOST circuit, a function of cutting off a charging circuit is implemented by the first lower transistor, and the first lower transistor in the BOOST circuit cannot implement a discharging function. In addition, it can be seen from FIG. 13 that the voltage input terminal in the BOOST circuit is disposed between the inductor L and a capacitor C, and the voltage output terminal is connected to the source of the first upper transistor. Therefore, compared with the first lower transistor in the BUCK circuit, the first lower transistor in the BOOST circuit is closer to the voltage input terminal, and the first lower transistor in the BOOST circuit cannot directly discharge the current of the inductor L.

Figure 14:
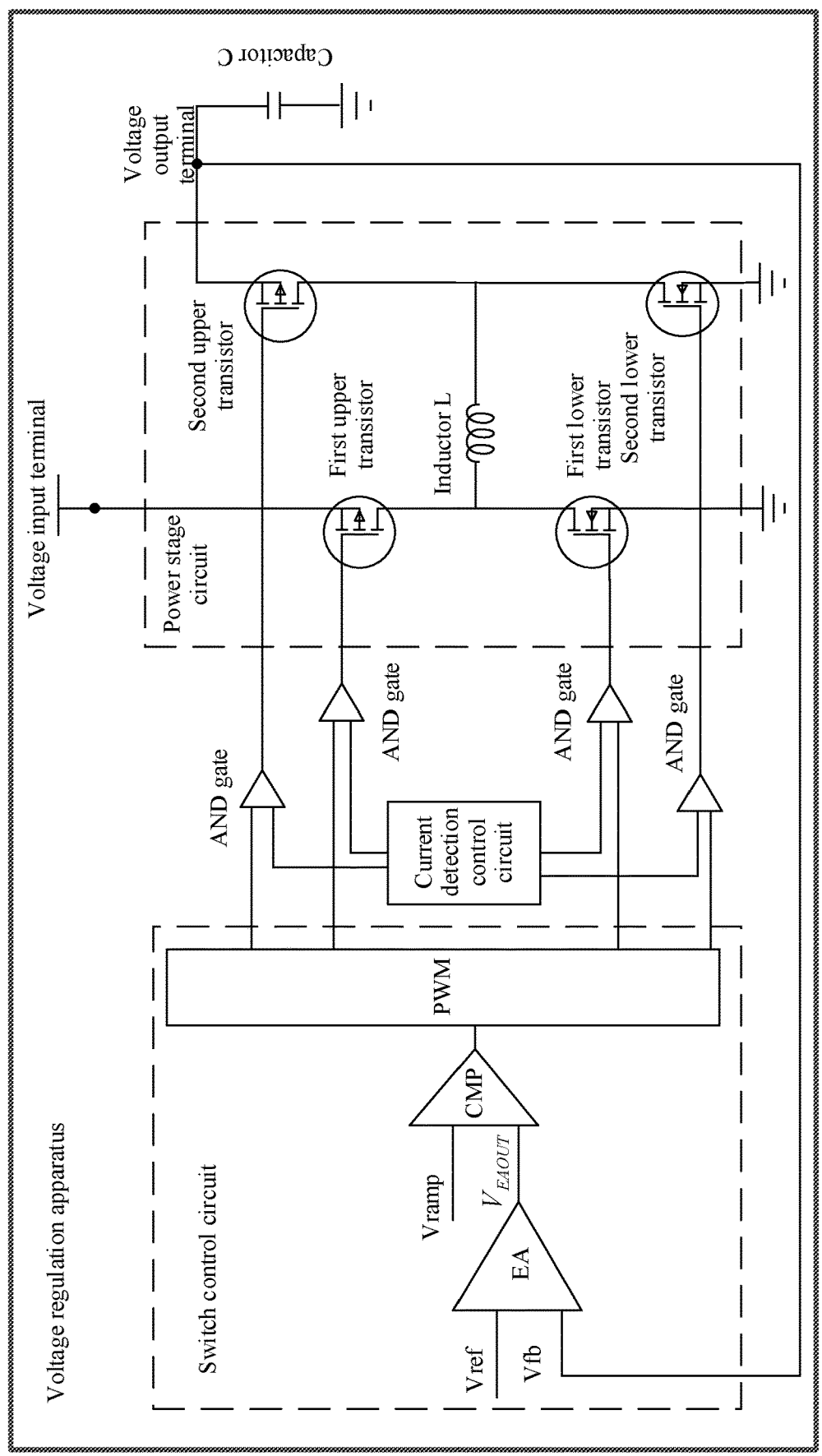
FIG. 14 is a schematic diagram of a structure in which a voltage regulation apparatus is applied to a BUCK-BOOST circuit according to an embodiment of this application.

The foregoing mainly uses the BUCK circuit and the BOOST circuit as examples for description. The following further describes the voltage regulation apparatus by using the BUCK-BOOST circuit as an example. For example, the switch power supply is the BUCK-BOOST circuit. FIG. 14 is a schematic diagram of a structure in which the voltage regulation apparatus is applied to the BUCK-BOOST circuit according to an embodiment of this application. The BUCK-BOOST circuit may include the switch control circuit, the current detection control circuit, the power stage circuit, and the filtering network.

The at least one transistor in the power stage circuit includes a first upper transistor, a second upper transistor, a first lower transistor, and a second lower transistor. A gate of the first upper transistor is connected to an out terminal of a pulse width modulator PWM and the out terminal of the current detection control circuit by using an AND gate, a source of the first upper transistor is connected to the voltage input terminal, and a drain of the first upper transistor is coupled to an inductor L. A gate of the first lower transistor may be connected to the out terminal of the pulse width modulator PWM and the out terminal of the current detection control circuit by using an AND gate, a source of the first lower transistor is connected to a ground terminal, and a drain of the first lower transistor is coupled to the inductor L. A gate of the second upper transistor is connected to the out terminal of the pulse width modulator PWM and the out terminal of the current detection control circuit by using an AND gate, a source of the second upper transistor is connected to the voltage output terminal, and a drain of the second upper transistor is coupled to the inductor L. A gate of the second lower transistor may be connected to the out terminal of the pulse width modulator PWM and the out terminal of the current detection control circuit by using an AND gate, a source of the second lower transistor is connected to the ground terminal, and a drain of the second lower transistor is coupled to the inductor L.

It should be noted that the switch control circuit and the current detection control circuit are respectively connected to the first upper transistor and the first lower transistor by using the "AND gate" relationship. In addition, an error amplifier EA, a comparator CMP, and the pulse width modulator PWM that are included in the switch control circuit in FIG. 14 may be understood with reference to the content described in FIG. 12. Details are not described herein again. In addition, the current detection control circuit in FIG. 14 may be understood with reference to the content described in FIG. 5 to FIG. 9. Details are not described herein again.

It should be understood that FIG. 14 is merely an example description of a connection relationship between the first transistor and the second transistor and a connection relationship between the second upper transistor and the second lower transistor. Another connection relationship may be further included in this embodiment of this application. This is not specifically limited in this embodiment of this application.

It should be noted that the foregoing mainly uses the BUCK circuit, the BOOST circuit, and the BUCK-BOOST circuit as examples to describe the voltage regulation apparatus in this embodiment of this application. In an actual application, the voltage regulation apparatus may alternatively be another circuit that needs to implement overcurrent protection, for example, the LDO circuit. This is not specifically limited in this embodiment of this application.

FIG. 2 to FIG. 14 mainly describe dynamic limiting of the current parameter of the power stage circuit based on the plurality of preset overcurrent protection thresholds. Compared with an existing current limiting mechanism that is directly implemented based on a fixed current limiting threshold, this current limiting mechanism can be flexibly and dynamically implemented, to implement overcurrent protection. In addition, on the premise of ensuring reliability, a miniaturization trend of a terminal product in a scenario with a non-constant current load is met to a maximum extent, and a constraint condition for selecting the component such as the inductor is released. This reduces costs.

2. Describe a Dynamic Regulation Process of the OCP Parameter from a Perspective of Directly Obtaining the Temperature Information.

The temperature information may include but is not limited to heat information caused by an ambient temperature, or temperatures of components such as a chip, a transistor, and an inductor. The ambient temperature is used as an example. An inductor temperature rise is directly proportional to a square of a valid current flowing through the inductor, and inductor temperature=ambient temperature+inductor temperature rise value. Based on this, corresponding inductor temperature rise values under different currents are shown in the following Table 3:

TABLE 3

| Inductor temperature rise value | Temperature rise current ratio I | Temperature rise current |
|---|---|---|
| 40 | 1.00 | 5.00 |
| 50 | 1.12 | 5.59 |
| 60 | 1.22 | 6.12 |
| 70 | 1.32 | 6.61 |
| 80 | 1.41 | 7.07 |
| 90 | 1.50 | 7.50 |
| 100 | 1.58 | 7.91 |
| 110 | 1.66 | 8.29 |
| 120 | 1.73 | 8.66 |
| 130 | 1.80 | 9.01 |
| 140 | 1.87 | 9.35 |

It can be seen from Table 3 that, the temperature rise current increases with an increase in the inductor temperature rise value. If information about the ambient temperature can be obtained, the current limiting threshold Ia may also accordingly increase.

In view of this, this embodiment may be understood with reference to the voltage regulation apparatus described in FIG. 7. The temperature obtaining module is mainly configured to obtain the temperature information, so that the current detection control circuit can set the current limiting threshold to the first value based on the temperature information. In addition, when the current detection control circuit obtains the current parameter for indicating the load current of at least one transistor, the current detection control circuit can compare the current parameter with the current limiting threshold, and output the control signal when the current parameter is greater than or equal to the current limiting threshold, so that the control signal can be used to limit the current parameter.

In this embodiment, a function of collecting a temperature is added to the voltage regulation apparatus, that is, the temperature information is obtained by the temperature obtaining module. For details, refer to FIG. 8a to FIG. 8c. Because the thermistor $R_{NTC}$ changes with the temperature, the voltage between the voltage divider resistor R1 and the thermistor $R_{NTC}$ can indicate the temperature, the temperature obtaining module can obtain the temperature information based on the voltage between the voltage divider resistor R1 and the thermistor $R_{NTC}$ that are built in the voltage regulation apparatus. For details, refer to FIG. 8a. Alternatively, the SOC obtains the temperature information based on the voltage between the voltage divider resistor R1 and the thermistor $R_{NTC}$ that are built in the SOC, and sends the temperature information to the temperature obtaining module by using the analog signal or the digital signal. For details, refer to FIG. 8b and FIG. 8c. Details are not described herein again.

It should be noted that the foregoing temperature information includes at least one of the following: ambient temperature information, and temperature information of components such as a chip, a transistor, and an inductor. This is not specifically limited in this embodiment of this application.

In this way, the current detection control circuit sets the current limiting threshold to the first value based on the temperature information, so that the current limiting threshold obtained after the setting can be used to compare with the current parameter, and when the current parameter is greater than the current limiting threshold, the control signal is output, to limit the current parameter and implement overcurrent protection.

The ambient temperature information is used as an example for description. Generally, the inductor temperature is 125° C., which is a maximum operating temperature in inductor specifications. If the ambient temperature is 25° C., the inductor temperature rise value 100° C. may be obtained based on the following formula: inductor temperature=ambient temperature+inductor temperature rise value, that is, the temperature of the inductor is allowed to rise to 100° C. In this case, calculation is performed based on the temperature rise current of 5 A. At this time, the current limiting threshold Ia may be set to 1.58 times the inductor temperature rise current, that is, 7.91 A. That is, the current limiting threshold Ia may be regulated from the original temperature rise current of 5 A to 7.91 A. Compared with the original temperature rise current of 5 A, under the temperature rise current of 7.91 A, a through-current capability of the inductor can be explored to the maximum extent, and the current parameter can be flexibly limited.

It may be understood that the voltage regulation apparatus provided in this embodiment may further include the switch control circuit and the filtering network. For details, refer to the content described in FIG. 10 and FIG. 11. Details are not described herein again.

In addition, the voltage regulation apparatus provided in this embodiment of this application may include the LDO circuit and the switch power supply. The switch power supply may further include the BUCK circuit, the BOOST circuit, the BUCK-BOOST circuit, or the like. For details, refer to the content described in FIG. 12 to FIG. 14. Details are not described herein again.

It should be noted that, for brief description, the foregoing apparatus embodiments are each represented as a combination of a series of units or modules. However, persons skilled in the art should know that this application is not limited to the described units or modules, because according to this application, some steps may be performed in another unit or module. Persons skilled in the art should further know that embodiments described in this specification are all example embodiments, and the involved modules are not necessarily required by this application.

Figure 15:
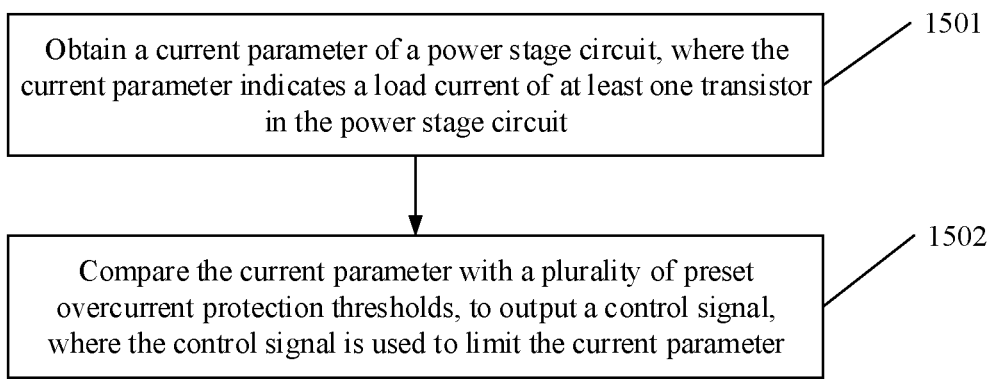
FIG. 15 is a schematic diagram of an overcurrent protection method according to an embodiment of this application.

The foregoing mainly describes in detail the voltage regulation apparatus provided in this embodiment of this application from a perspective of functional modules. Based on the voltage regulation apparatus described in FIG. 1 to FIG. 14, an embodiment of this application further provides an overcurrent protection method. FIG. 15 is a schematic diagram of an overcurrent protection method according to an embodiment of this application. The overcurrent protection method may be applied to the voltage regulation apparatus described in FIG. 1 to FIG. 14. As shown in FIG. 15, the method may include the following steps.

1501: Obtain a current parameter of a power stage circuit. The current parameter indicates a load current of at least one transistor in the power stage circuit. In this embodiment, because the current parameter can indicate the load current of the at least one transistor in the power stage circuit, current detection needs to be performed on the at least one transistor, to obtain the foregoing current parameter. For example, in an LDO circuit, the current parameter may be a valid value or the like of a load current of a transistor. Alternatively, in a switch power supply such as a BUCK circuit, a BOOST circuit, or a BUCK-BOOST circuit, because at least one transistor may include at least one upper transistor and at least one lower transistor, the current parameter may alternatively be an average value, that is, an average load current, of a load current of the at least one upper transistor and a load current of the at least one lower transistor, or the current parameter may also be a valid value related to a load current of the at least one upper transistor and a load current of the at least one lower transistor, or the like. This is not specifically limited in this embodiment of this application.

1502: Compare the current parameter with a plurality of preset overcurrent protection thresholds, to output a control signal. The control signal is used to limit the current parameter. In this embodiment, OCP parameters, namely a current limiting threshold, the plurality of preset overcurrent protection thresholds, over-limit duration thresholds and controlled duration thresholds corresponding to the plurality of preset overcurrent protection thresholds, and the like are preconfigured in register configuration based on heat information of a system. The plurality of preset overcurrent protection thresholds are all greater than the current limiting threshold. Therefore, in this embodiment of this application, the plurality of preset overcurrent protection thresholds, the over-limit duration thresholds and the controlled duration thresholds corresponding to the plurality of preset overcurrent protection thresholds, and the current limiting threshold that are preconfigured in a register may be applied to the voltage regulation apparatus, so that after obtaining the foregoing current parameter, the voltage regulation apparatus may compare the current parameter with the plurality of preset overcurrent protection thresholds, to output the control signal based on a comparison result, to implement a limiting operation on the current parameter based on the control signal. In this way, the current parameter may be limited to a criterion in which a current does not cause thermal damage to a component such as a chip, a transistor, or an inductor. Compared with an existing current limiting mechanism in which current limiting is directly enabled when the current parameter is greater than or equal to the current limiting threshold, in this mechanism provided in embodiments of this application, the current parameter can be limited based on the dynamic threshold, and this mechanism is applicable to a scenario with a non-constant current load, meets a miniaturization trend of a terminal product, and avoids an over-design.

It may be understood that, for the method for implementing overcurrent protection based on the dynamic OCP parameter in this embodiment, refer to partial content of the voltage regulation apparatus described in the foregoing FIG. 1 to FIG. 14 for understanding, and details are not described herein again.

Figure 16:
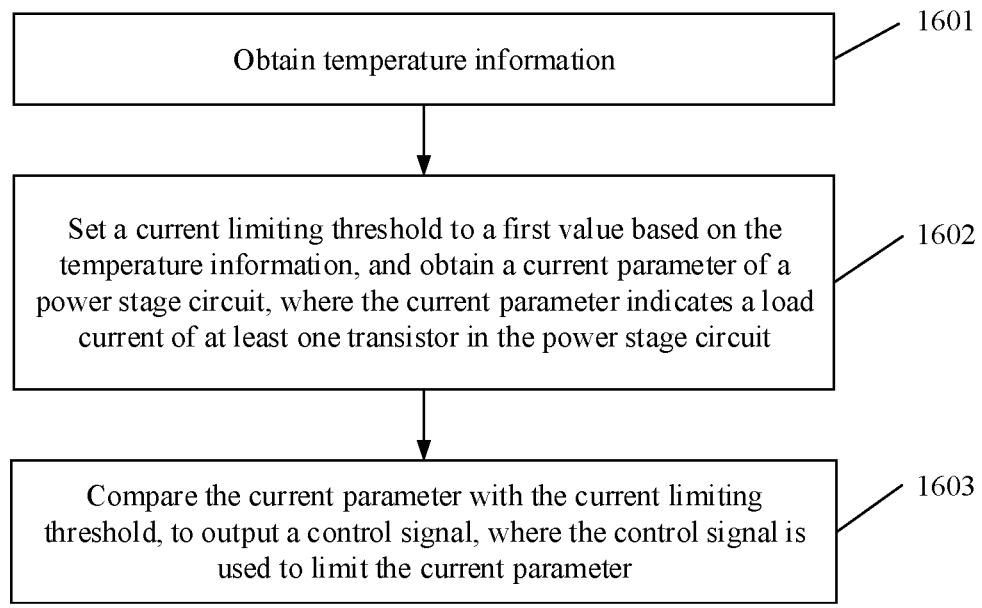
FIG. 16 is a schematic diagram of another overcurrent protection method according to an embodiment of this application.

In addition, a dynamical configuration process of an OCP parameter is described from a perspective of directly obtaining temperature information. FIG. 16 is a schematic diagram of an overcurrent protection method according to an embodiment of this application. As shown in FIG. 16, the overcurrent protection method may include the following steps.

1601: Obtain temperature information.

In this embodiment, the temperature information may include but is not limited to heat information caused by an ambient temperature or temperatures of components such as a chip, a transistor, and an inductor, a temperature rise causes an increase in a temperature rise current, and a temperature decrease also causes a decrease in the temperature rise current. Therefore, based on this rule, a voltage regulation apparatus may first obtain the temperature information. For example, the voltage regulation apparatus may obtain the temperature information based on a voltage between a voltage divider resistor R1 and a thermistor $R_{NTC}$ that are built in the voltage regulation apparatus. Alternatively, a SOC obtains the temperature information based on a voltage between a voltage divider resistor R1 and a thermistor $R_{NTC}$ that are built in the SOC, and sends the temperature information to the voltage regulation apparatus by using an analog signal or a digital signal. This is not specifically limited in this embodiment of this application.

1602: Set a current limiting threshold to a first value based on the temperature information, and obtain a current parameter of a power stage circuit. The current parameter indicates a load current of at least one transistor.

In this embodiment, after the temperature information is obtained, the current limiting threshold is set to the first value based on the temperature information, so that a through-current capability of a component such as an inductor can be explored to a maximum extent, and the set current limiting threshold can also be flexibly used as a dynamic overcurrent protection threshold.

1603: Compare the current parameter with the current limiting threshold, to output a control signal. The control signal is used to limit the current parameter.

It may be understood that, for the method for implementing overcurrent protection based on the dynamic OCP parameter in this embodiment, refer to partial content of the voltage regulation apparatus described in the foregoing embodiment for understanding, and details are not described herein again.

In conclusion, compared with an existing current limiting mechanism in which current limiting is directly enabled when the current parameter is greater than or equal to the current limiting threshold, in this mechanism in the overcurrent protection method provided in this embodiment of this application, the current parameter can be limited based on the dynamic threshold, and this mechanism is applicable to a scenario with a non-constant current load, meets a miniaturization trend of a terminal product, and avoids an over-design. In addition, the threshold can be regulated based on a temperature, so that a through-current capability of a component such as an inductor can be explored to a maximum extent.

The foregoing mainly describes the solutions provided in embodiments of this application from a perspective of hardware and the method. It may be understood that functions of the current detection control circuit in FIG. 1 to FIG. 14 may also be implemented in a form of computer software. Persons skilled in the art may use different methods to implement the described functions for each particular application, but it should not be considered that the implementation goes beyond the scope of this application.

From a perspective of a physical apparatus, the current detection control circuit may be implemented by one physical apparatus, or may be jointly implemented by a plurality of physical apparatuses, or may be a logical functional unit in one physical apparatus. This is not specifically limited in this embodiment of this application.

Figure 17:
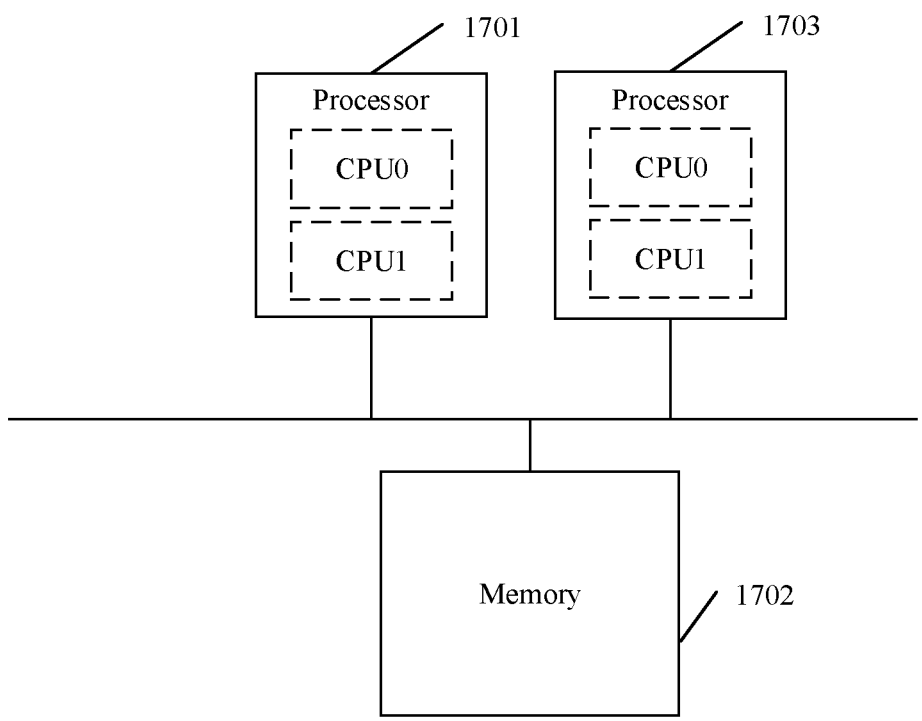
FIG. 17 is a schematic diagram of a structure of a current detection control device according to an embodiment of this application.

For example, the current detection control circuit may be implemented by a current detection control device in FIG. 17. FIG. 17 is a schematic diagram of a hardware structure of the current detection control device according to an embodiment of this application. The current detection control device includes at least one processor 1701 and a memory 1702.

The processor 1701 may be a general central processing unit (CPU), a microprocessor, an application-specific integrated circuit (server IC), or one or more integrated circuits for controlling program execution of the solutions of this application.

The memory 1702 may be a read-only memory (ROM) or another type of static storage device that can store static information and instructions, or a random access memory (RAM) or another type of dynamic storage device that can store information and instructions, or may be an electrically erasable programmable read-only memory (EEPROM), a compact disc read-only memory (CD-ROM) or another compact disc storage, optical disc storage (including a compact disc, a laser disc, an optical disc, a digital versatile disc, a Blu-ray disc, or the like), a magnetic disk storage medium or another magnetic storage device, or any other medium that can be accessed by a computer and that can be configured to carry or store expected program code in an instruction form or in a data structure form, but is not limited thereto. The memory 1702 may independently exist, or the memory 1702 may be integrated with the processor 1701.

The memory 1702 is configured to store computer-executable instructions for performing the solutions of this application, and the processor 1701 controls execution. The processor 1701 is configured to execute the computer-executable instructions stored in the memory 1702, to implement the overcurrent protection method according to the foregoing method embodiment of this application.

In a possible implementation, the computer-executable instructions in this embodiment of this application may also be referred to as application code. This is not specifically limited in this embodiment of this application.

During specific implementation, in an embodiment, the processor 1701 may include one or more CPUs, for example, a CPU0 and a CPU1 in FIG. 17.

During specific implementation, in an embodiment, the current detection control device may include a plurality of processors, for example, the processor 1701 and a processor 1703 in FIG. 17. Each of the processors may be a single-core (single-CPU) processor, or may be a multi-core (multi-CPU) processor. The processor herein may refer to one or more devices, circuits, and/or processing cores configured to process data (for example, the computer-executable instructions).

From a perspective of functional units, in this application, the current detection control device may be divided into functional units based on the foregoing method embodiment. For example, each functional unit may be obtained through division based on a corresponding function, or two or more functions may be integrated into one functional unit. The integrated functional unit may be implemented in a form of hardware, or may be implemented in a form of a software functional unit.

Figure 18:
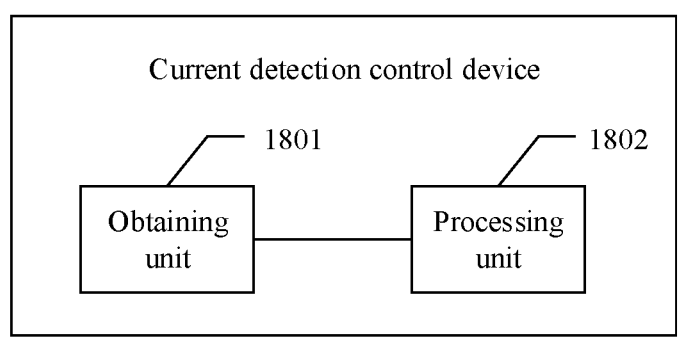
FIG. 18 is a schematic diagram of another structure of a current detection control device according to an embodiment of this application.

For example, when the function units are divided through integration, FIG. 18 is a schematic diagram of a structure of a current detection control device. As shown in FIG. 18, an embodiment of the current detection control device in this application may include an obtaining unit 1801 and a processing unit 1802.

The obtaining unit 1801 is configured to obtain a current parameter of a power stage circuit. The current parameter indicates a load current of at least one transistor in the power stage circuit.

The processing unit 1802 is configured to compare the current parameter with a plurality of preset overcurrent protection thresholds, to output a control signal. The control signal is used to limit the current parameter.

It may be understood that, in some other embodiments, the processing unit 1802 is configured to: set a current limiting threshold to a first value based on temperature information, and obtain the current parameter of the power stage circuit, where the current parameter indicates the load current of the at least one transistor in the power stage circuit; and compare the current parameter with the current limiting threshold, to output the control signal. The control signal is used to limit the current parameter.

In this embodiment of this application, the current detection control device is presented in a form of functional units obtained through division in an integrated manner. The "functional unit" herein may be an application-specific integrated circuit (ASIC), a processor and a memory that execute one or more software or firmware programs, an integrated logic circuit, and/or another device that can provide the foregoing functions. In a simple embodiment, persons skilled in the art may figure out that the current detection control device may be in a form shown in FIG. 17.

For example, the processor 1701 in FIG. 17 may invoke the computer-executable instructions stored in the memory 1702, to enable the current detection control device to perform the method in the method embodiment corresponding to FIG. 15 or FIG. 16.

Specifically, functions/implementation processes of the obtaining unit 1801 and the processing unit 1802 in FIG. 18 may be implemented by the processor 1701 in FIG. 17 by invoking the computer-executable instructions stored in the memory 1702.

Although some preferred embodiments of this application have been described, persons skilled in the art can make changes and modifications to these embodiments once they learn the basic inventive concept. Therefore, the following claims are intended to be construed as to cover the preferred embodiments and all changes and modifications falling within the scope of this application.

Clearly, persons skilled in the art can make various modifications and variations to embodiments of this application without departing from the spirit and scope of embodiments of this application. In this way, this application is intended to cover these modifications and variations of embodiments of this application provided that they fall within the scope of protection defined by the following claims and their equivalent technologies.

The invention claimed is:

1. A voltage regulation apparatus, comprising:
a voltage input terminal configured to receive an input voltage;
a power stage circuit that includes at least one transistor;
a voltage output terminal configured to generate an output voltage;
a current detection control circuit is configured to:

obtain a current parameter of the power stage circuit based on a detected load current of the at least one transistor, wherein the current parameter indicates the load current of the at least one transistor;
dynamically set a target over-limit duration threshold based on the current parameter; and
output a control signal to limit the load current of the at least one transistor when a first duration is greater than the target over-limit duration threshold, wherein the first duration is a duration in which the current parameter is greater than or equal to a current limiting threshold.

2. The voltage regulation apparatus according to claim 1, wherein the current detection control circuit comprises a current limiting control module configured to:
compare the current parameter with a plurality of overcurrent protection thresholds
select, based on the comparison, the target over-limit duration threshold from a plurality of over-limit duration thresholds corresponding to the plurality of overcurrent protection thresholds, and
output the control signal when the first duration is greater than the target over-limit duration threshold, and the plurality of preset overcurrent protection thresholds are all greater than the current limiting threshold.

3. The voltage regulation apparatus according to claim 2, wherein the current detection control circuit further comprises a temperature obtaining module, wherein:
the temperature obtaining module is configured to obtain temperature information; and
the current limiting control module is further configured to set each of the plurality of over-limit duration thresholds to a second duration based on the temperature information.

4. The voltage regulation apparatus according to claim 1, wherein the current detection control circuit further comprises a timing module, wherein:
the current limiting control module is further configured to compare the current parameter with the current limiting threshold; and
the timing module is configured to count the first duration when the current parameter is greater than or equal to the current limiting threshold.

5. The voltage regulation apparatus according to claim 1, wherein the control signal is used to turn off the at least one transistor, to limit the load current.

6. The voltage regulation apparatus according to claim 1, wherein the control signal is used to limit a current passing through the at least one transistor to a corresponding standard current, to limit the control signal.

7. The voltage regulation apparatus according to claim 1, wherein the voltage regulation apparatus further comprises a switch control circuit, wherein
the switch control circuit is configured to receive a feedback voltage indicating the output voltage, and control the at least one transistor based on the feedback voltage, to regulate the output voltage.

8. The voltage regulation apparatus according to claim 1, wherein the voltage regulation apparatus further comprises a filtering network, and the filtering network is coupled to the voltage output terminal or the voltage input terminal.

9. The voltage regulation apparatus according to claim 1, wherein the target over-limit duration threshold decreases as the current parameter increases.

10. An overcurrent protection method, performed by a voltage regulation apparatus, wherein the method comprises:
receiving an input voltage by a voltage input terminal in the voltage regulation apparatus;
generating an output voltage by a voltage output terminal in the voltage regulation apparatus;
obtaining a current parameter based on a detected load current of at least one transistor, of a power stage circuit in the voltage regulation apparatus, wherein the current parameter indicates a load current of the at least one transistor in the power stage circuit; and
dynamically setting a target over-limit duration threshold based on the current parameter, and outputting a control signal when a first duration is greater than the target over-limit duration threshold, wherein the control signal is used to limit the current parameter, and the first duration is a duration in which the current parameter is greater than or equal to a current limiting threshold.

11. The method according to claim 10, wherein the control signal being used to limit the current parameter comprises: the control signal is used to turn off the at least one transistor, to limit the current parameter.

12. The method according to claim 10, wherein the control signal being used to limit the current parameter comprises: the control signal is used to limit a current passing through the at least one transistor to a corresponding standard current, to limit the current parameter.

13. The method according to claim 10, further comprising:
comparing the current parameter with the current limiting threshold;
count the first duration when the current parameter is greater than or equal to the current limiting threshold.

14. The method according to claim 10, further comprising: receiving a feedback voltage indicating the output voltage; and
controlling the at least one transistor based on the feedback voltage, to regulate the output voltage.

15. A system, comprising:
a system on chip (SOC); and
a voltage regulation apparatus coupled to the SOC, comprising:
a voltage input terminal configured to receive an input voltage,
a power stage circuit that includes at least one transistor;
a voltage output terminal configured to generate an output voltage for the SOC;
a current detection control circuit is configured to:
obtain a current parameter of the power stage circuit, wherein the current parameter indicates a load current of the at least one transistor;
dynamically set a target over-limit duration threshold based on the current parameter; and
output a control signal to limit the load current when a first duration is greater than the target over-limit duration threshold, wherein the first duration is a duration in which the current parameter is greater than or equal to a current limiting threshold.

16. The chip according to claim 15,
wherein the current detection control circuit comprises a current limiting control module configured to:
compare the current parameter with a plurality of overcurrent protection thresholds
select, based on the comparison, the target over-limit duration threshold from a plurality of over-limit duration thresholds corresponding to the plurality of overcurrent protection thresholds, and
output the control signal when the first duration is greater than the target over-limit duration threshold, and the plurality of preset overcurrent protection thresholds are all greater than the current limiting threshold.

17. The chip according to claim 16, wherein the current detection control circuit further comprises a temperature obtaining module, wherein:
   the temperature obtaining module is configured to obtain temperature information; and
   the current limiting control module is further configured to set each of the plurality of over-limit duration thresholds to a second duration based on the temperature information.

18. The chip according to claim 15, wherein the control signal is used to turn off the at least one transistor, to limit the control signal.

19. The chip according to claim 15, wherein the voltage regulation apparatus further comprises a switch control circuit, wherein
   the switch control circuit is configured to receive a feedback voltage indicating the output voltage, and control the at least one transistor based on the feedback voltage, to regulate the output voltage.

20. The chip according to claim 15, wherein the target over-limit duration threshold decreases as the current parameter increases.

\* \* \* \* \*